US012783779B2

(12) United States Patent
Kitamura

(10) Patent No.: US 12,783,779 B2
(45) Date of Patent: Nov. 3, 2026

(54) WIRING DATA GENERATION APPARATUS, DRAWING SYSTEM, AND WIRING DATA GENERATION METHOD

(71) Applicant: SCREEN Holdings Co., Ltd., Kyoto (JP)

(72) Inventor: Kiyoshi Kitamura, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 820 days.

(21) Appl. No.: 18/026,534

(22) PCT Filed: Sep. 14, 2021

(86) PCT No.: PCT/JP2021/033737
§ 371 (c)(1),
(2) Date: Mar. 15, 2023

(87) PCT Pub. No.: WO2022/070886
PCT Pub. Date: Apr. 7, 2022

(65) Prior Publication Data
US 2023/0359802 A1 Nov. 9, 2023

(30) Foreign Application Priority Data
Oct. 1, 2020 (JP) ................................ 2020-167073

(51) Int. Cl.
*G06F 30/394* (2020.01)
*G06F 119/02* (2020.01)

(52) U.S. Cl.
CPC ........ *G06F 30/394* (2020.01); *G06F 2119/02* (2020.01)

(58) Field of Classification Search
CPC .......................... G06F 30/394; G06F 2119/02
(Continued)

(56) References Cited

U.S. PATENT DOCUMENTS 4,835,704 A 5/1989 Eichelberger et al.
6,434,730 B1 * 8/2002 Ito ...................... H01L 23/5223 716/120

(Continued)

FOREIGN PATENT DOCUMENTS

CN 1574328 A 2/2005
EP 1592183 A1 * 11/2005 ............ H04L 45/48

(Continued)

OTHER PUBLICATIONS

International Search Report mailed Dec. 7, 2021 in corresponding PCT International Application No. PCT/JP2021/033737.

(Continued)

*Primary Examiner* — Suresh Memula
(74) *Attorney, Agent, or Firm* — OSTROLENK FABER LLP

(57) ABSTRACT

A design wiring data acquisition unit acquires design wiring data indicating design wiring for connecting element electrodes at design positions on a substrate and connection destination electrodes to each other. A partial wiring data generation unit generates partial wiring data indicating partial wiring obtained by deleting peripheral portions of the design positions of the element electrodes in the design wiring. An actual position data acquisition unit acquires actual position data indicating actual positions of the element electrodes on the substrate. A corrected wiring data generation unit generates corrected wiring data indicating corrected wiring that connects the partial wiring and the element electrodes at the actual positions to each other.

9 Claims, 21 Drawing Sheets

(58) Field of Classification Search
USPC .......................................................... 716/100
See application file for complete search history.

(56) References Cited

U.S. PATENT DOCUMENTS

| | | | | |
|---|---|---|---|---|
| 6,779,167 | B2 * | 8/2004 | Igarashi | G06F 30/394 257/E23.145 |
| 7,577,931 | B2 * | 8/2009 | Masuko | H01L 23/50 716/120 |
| 7,871,831 | B1 * | 1/2011 | Yao | G06F 30/39 716/126 |
| 8,191,034 | B1 * | 5/2012 | Mohan | G06F 30/398 716/136 |
| 8,595,662 | B1 * | 11/2013 | Yu | G06F 30/39 716/110 |
| 8,736,301 | B2 * | 5/2014 | Xie | H04L 49/109 327/566 |
| 2002/0144221 | A1 | 10/2002 | Noda | |
| 2003/0224266 | A1 | 12/2003 | Akagawa et al. | |
| 2004/0238973 | A1 | 12/2004 | Wakisaka et al. | |
| 2005/0155001 | A1 * | 7/2005 | Kinoshita | G06F 30/30 716/134 |
| 2007/0187777 | A1 * | 8/2007 | Itoh | H10D 89/10 716/120 |
| 2008/0005715 | A1 * | 1/2008 | Shimizu | G06F 30/394 716/134 |
| 2008/0250361 | A1 * | 10/2008 | Bae | G03F 1/72 716/132 |
| 2009/0113374 | A1 * | 4/2009 | Nakagawa | G06F 30/394 716/130 |
| 2009/0178013 | A1 * | 7/2009 | Wang | G06F 30/30 716/132 |
| 2009/0193386 | A1 * | 7/2009 | Hirai | G03F 1/36 716/55 |
| 2010/0032809 | A1 * | 2/2010 | Collins | H01L 23/522 257/E21.597 |
| 2010/0269075 | A1 * | 10/2010 | Tonti | G06F 30/20 716/132 |
| 2011/0024869 | A1 * | 2/2011 | Nakajima | H10D 89/10 700/121 |
| 2013/0019220 | A1 * | 1/2013 | Maruyama | H01J 37/3174 716/126 |
| 2014/0007033 | A1 * | 1/2014 | Kitamura | G06F 30/398 716/112 |
| 2014/0143747 | A1 * | 5/2014 | Wang | G06F 30/394 716/129 |

FOREIGN PATENT DOCUMENTS

| | | | |
|---|---|---|---|
| JP | S63-186426 | A | 8/1988 |
| JP | H5-242200 | A | 9/1993 |
| JP | 2012-42587 | A | 3/2012 |
| JP | 2014-11264 | A | 1/2014 |
| JP | 2015-060146 | A | 3/2015 |
| JP | 2016-071022 | A | 5/2016 |
| JP | 2018-173498 | A | 11/2018 |
| JP | 2020-077215 | A | 5/2020 |
| KR | 10-2015-0034605 | A | 4/2015 |
| KR | 10-2016-0038790 | A | 4/2016 |
| KR | 101802561 | B1 | 11/2017 |

OTHER PUBLICATIONS

Written Opinion mailed Dec. 7, 2021 in corresponding PCT International Application No. PCT/JP2021/033737.
Decision of Grant and Search Report dated Jul. 22, 2025 in corresponding Chinese Patent Application No. 202180067695.3 with English language translation.
Notice of Decision to Grant dated Feb. 26, 2026 in corresponding Korean Patent Application No. 10-2023-7010088.

* cited by examiner

1

WIRING DATA GENERATION APPARATUS, DRAWING SYSTEM, AND WIRING DATA GENERATION METHOD

CROSS-REFERENCE TO RELATED APPLICATIONS

The present application is a 35 U.S.C. §§ 371 national phase conversion of International Application No. PCT/JP2021/033737, filed Sep. 14, 2021, which claims priority to Japanese Patent Application No. 2020-167073, filed Oct. 1, 2020, the contents of both of which are incorporated herein by reference. The PCT International Application was published in the Japanese language.

TECHNICAL FIELD

The present invention relates to a wiring data generation apparatus, a drawing system, and a wiring data generation method.

BACKGROUND ART

In a chip-first type system in package (SIP) or wafer level package (WLP) manufacturing process, wiring is performed between integrated circuits (ICs) or between pads and bumps of the ICs by using a redistribution layer. At this time, it is necessary to cope with an arrangement error of the IC bonded on a substrate as a support.

In a case where an exposure processing for forming the redistribution layer is performed by a stepper using a mask, a position, an angle, and the like can be finely adjusted with respect to overlapping of exposures in response to the arrangement error. However, there is a limit to a measure by such fine adjustment. In particular, in a case where exposure for forming a plurality of redistribution layers for ICs arranged on the substrate is collectively performed, since each IC usually has an arrangement error different from each other, it is difficult to sufficiently cope with the arrangement error of each IC only by fine adjustment of overlapping in one exposure. If the measure for the arrangement errors is insufficient, a connection failure occurs in the redistribution layer.

On the other hand, a technique for performing direct exposure by scanning with an exposure beam without using a mask is known. According to this technique, it is easier to cope with an IC arrangement error than a method using a mask. In other words, when there is the arrangement error, wiring data indicating a corrected wiring pattern is generated by redesigning the wiring pattern from the beginning in response to the arrangement error. The generated wiring data usually has a format for a mask CAD, and in this case, the generated wiring data is converted into drawing data in a raster data format by performing raster image processing (RIP) for a drawing apparatus. The drawing apparatus performs direct exposure using the drawing data. However, generation of wiring data by redoing such design requires a large calculation load. Therefore, in a direct exposure technique, a technique for shortening time required for generating the wiring data corresponding to the arrangement error has been proposed.

For example, Japanese Patent Application Laid-Open No. 2016-71022 (Patent Document 1) discloses a method for generating connection wiring data indicating a connection wiring pattern. The connection wiring pattern electrically connects individual electrodes of a semiconductor chip arranged on a substrate and connection destination electrodes provided on the substrate based on a predetermined connection relationship defined in a netlist. In this method, a reference chip is defined by a chip state in which the semiconductor chip is disposed on a substrate at a predetermined reference position and a predetermined reference angle. Reference fan-out wiring in a reference chip region is generated in a state where the reference chip is arranged at a reference position at a reference angle. Further, the netlist is generated for a target wiring pattern in a redistribution region adjacent to a chip region. Then, the fan-out wiring for the semiconductor chip on the substrate is generated from the reference fan-out wiring in response to the arrangement error of the semiconductor chip, and the target wiring pattern is redistributed in response to the arrangement error so as to be connected to the fan-out wiring of the semiconductor chip based on the netlist, and a new wiring pattern is generated. According to this technique, since it is not necessary to redesign the wiring pattern from the beginning, the wiring data in response to the arrangement error can be efficiently generated.

PRIOR ART DOCUMENT

Patent Document

Patent Document 1: Japanese Patent Application Laid-Open No. 2016-71022

SUMMARY

Problem to be Solved by the Invention

The technique of the publication above is based on a premise that the connection wiring pattern has one end constituted by the fan-out wiring in the reference chip region and the other end constituted by the target wiring pattern in the redistribution region outside the reference chip region. The one end of the connection wiring pattern is connected to the electrode of the semiconductor chip, and the other end of the connection wiring pattern is connected to the connection destination electrode. Accordingly, the position of the connection destination electrode is the position of the other end of the connection wiring pattern, that is, the position outside the reference chip region in a planar layout. On the other hand, in recent years, a wiring pattern has also been required, in which the connection destination electrodes at least partially overlap with the semiconductor chip (more broadly, an electrical element) in the planar layout. However, since the technique of the above publication is based on a premise that the connection destination electrodes are outside the region of the semiconductor chip as described above, it is not possible to cope with this necessity.

The present invention has been made to solve the problems above, and an object thereof is to provide a wiring data generation apparatus, a drawing system, and a wiring data generation method capable of efficiently generating wiring data indicating wiring for connecting electrodes of an electrical element arranged on the substrate and the connection destination electrodes arranged so as to at least partially overlap with the electrical element in a planar layout to each other while coping with positional displacement of the electrical element on the substrate.

Means to Solve the Problem

A first aspect is a wiring data generation apparatus that generates wiring data indicating wiring for electrically connecting element electrodes of an electrical element arranged on a substrate and connection destination electrodes to be arranged so as to at least partially overlap with the electrical element in a planar layout to each other, the wiring data generation apparatus including: a design wiring data acquisition unit; a partial wiring data generation unit; an actual position data acquisition unit; and a corrected wiring data generation unit. The design wiring data acquisition unit acquires design wiring data indicating design wiring for connecting the element electrodes at design positions on the substrate and the connection destination electrodes to each other. The partial wiring data generation unit generates partial wiring data indicating partial wiring obtained by deleting peripheral portions of the design positions of the element electrodes in the design wiring. The actual position data acquisition unit acquires actual position data indicating actual positions of the element electrodes on the substrate. The corrected wiring data generation unit generates corrected wiring data indicating corrected wiring that connects the partial wiring and the element electrodes at the actual positions to each other.

A second aspect is the wiring data generation apparatus of the first aspect, in which the corrected wiring data generation unit includes a passing position acquisition unit that acquires a passing position, and the corrected wiring data generation unit generates the corrected wiring data such that the corrected wiring passes through the passing position acquired by the passing position acquisition unit.

A third aspect is the wiring data generation apparatus of the first or second aspect, further including a design wiring generating unit configured to generate the design wiring data based on the design positions of the element electrodes of the electrical element and assumed positions where the connection destination electrodes are to be arranged, in which the design wiring data acquisition unit acquires the design wiring data generated by the design wiring generating unit.

A fourth aspect is the wiring data generation apparatus according to any one of the first to third aspects, in which the corrected wiring data generation unit includes a determination unit that determines whether or not the corrected wiring data can be normally generated.

A fifth aspect is the wiring data generation apparatus according to the fourth aspect, further including an error position generation unit configured to generate error positions having an error from the design positions of the element electrodes based on predetermined rules, in which the determination unit determines whether or not the corrected wiring data can be normally generated on an assumption that the actual positions are at the error positions.

A sixth aspect is a drawing system including: the wiring data generation apparatus according to any one of the first to fifth aspects; a stage configured to hold the substrate; a photographing unit configured to photograph the electrical element in order to calculate actual position data indicating the actual positions of the element electrodes of the electrical element on the substrate held by the stage; and an optical head unit configured to directly expose the substrate based on the wiring data generated by the wiring data generation apparatus.

A seventh aspect is a wiring data generation method for generating wiring data indicating wiring for electrically connecting element electrodes of an electrical element arranged on a substrate and connection destination electrodes to be arranged so as to at least partially overlap with the electrical element in a planar layout to each other, the wiring data generation method including: a design wiring data acquisition step; a partial wiring data generation step; an actual position data acquisition step; and a corrected wiring data generation step. The design wiring data acquisition step acquires design wiring data indicating design wiring for connecting the element electrodes at design positions on the substrate and the connection destination electrodes to each other. The partial wiring data generation step generates partial wiring data indicating partial wiring obtained by deleting peripheral portions of the design positions of the element electrodes in the design wiring. The actual position data acquisition step acquires actual position data indicating actual positions of the element electrodes on the substrate. The corrected wiring data generation step generates corrected wiring data indicating corrected wiring that connects the partial wiring and the element electrodes at the actual positions to each other.

An eighth aspect is the wiring data generation method according to the seventh aspect, in which the corrected wiring data generation step includes a passing position acquisition step of acquiring a passing position, and the corrected wiring data generation step generates the corrected wiring data such that the corrected wiring passes through the passing position acquired in the passing position acquisition step.

A ninth aspect is the wiring data generation method according to the seventh or eighth aspect, further including a design wiring generation step of generating the design wiring data based on the design positions of the element electrodes of the electrical element and assumed positions where the connection destination electrodes are to be arranged, in which the design wiring data acquisition step acquires the design wiring data generated by the design wiring generation step.

Effects of the Invention

According to the first aspect, the wiring data generation apparatus uses, as part of the generated wiring data, the partial wiring corresponding to portions other than the peripheral portions of the design positions of the element electrodes of the electrical element in the design wiring. Thus, the wiring data can be efficiently generated. Furthermore, since the wiring data generation apparatus generates the corrected wiring data indicating the corrected wiring that connects the partial wiring and the element electrodes at the actual positions to each other as the other part of the generated wiring data, it is possible to perform corrections corresponding to deviations between the design positions and the actual positions of the electrical element on the substrate. As described above, the wiring data can be efficiently generated while performing the corrections corresponding to the deviations of the electrical element from the design positions on the substrate.

According to the second aspect, the wiring data generation apparatus generates the corrected wiring data such that the corrected wiring passes through the passing position acquired by the passing position acquisition unit. Thus, it is possible to avoid an unnecessary increase in a degree of freedom in designing the corrected wiring. Accordingly, an automatic generation of the corrected wiring can be made efficient.

According to the third aspect, the design wiring data acquisition unit of the wiring data generation apparatus acquires the design wiring data generated by the design wiring generating unit of the wiring data generation apparatus. Thus, the wiring data generation apparatus itself can prepare the design wiring data.

According to the fourth aspect, the corrected wiring data generation unit of the wiring data generation apparatus includes the determination unit that determines whether or not the corrected wiring data can be normally generated. Thus, a progress of the process using the abnormal corrected wiring data is avoided in the middle of the process.

According to the fifth aspect, the wiring data generation apparatus determines whether or not the corrected wiring data can be normally generated on an assumption that the actual positions are at the error positions. Thus, the determination can be made before the actual positions are acquired. Accordingly, the determination can be performed earlier.

According to the sixth aspect, the substrate can be directly exposed using the wiring data generation apparatus.

According to the seventh aspect, the wiring data generation method uses, as part of the generated wiring data, the partial wiring corresponding to portions other than the peripheral portions of the design positions of the element electrodes of the electrical element in the design wiring. Thus, the wiring data can be efficiently generated. Furthermore, since the wiring data generation method generates the corrected wiring data indicating the corrected wiring that connects the partial wiring and the element electrodes at the actual positions to each other as the other part of the generated wiring data, it is possible to perform corrections corresponding to deviations between the design positions and the actual positions of the electrical element on the substrate. As described above, the wiring data can be efficiently generated while performing the corrections corresponding to the deviations of the electrical element from the design positions on the substrate.

According to the eighth aspect, the wiring data generation method generates the corrected wiring data such that the corrected wiring passes through the passing position acquired in the passing position acquisition step. Thus, it is possible to avoid an unnecessary increase in a degree of freedom in designing the corrected wiring. Accordingly, the automatic generation of the corrected wiring can be made efficient.

According to the ninth aspect, the design wiring data acquisition step of the wiring data generation method acquires the design wiring data generated by the design wiring generation step of the wiring data generation method. Thus, the design wiring data can be prepared in the wiring data generation method.

DESCRIPTION OF EMBODIMENTS

Figure 1:
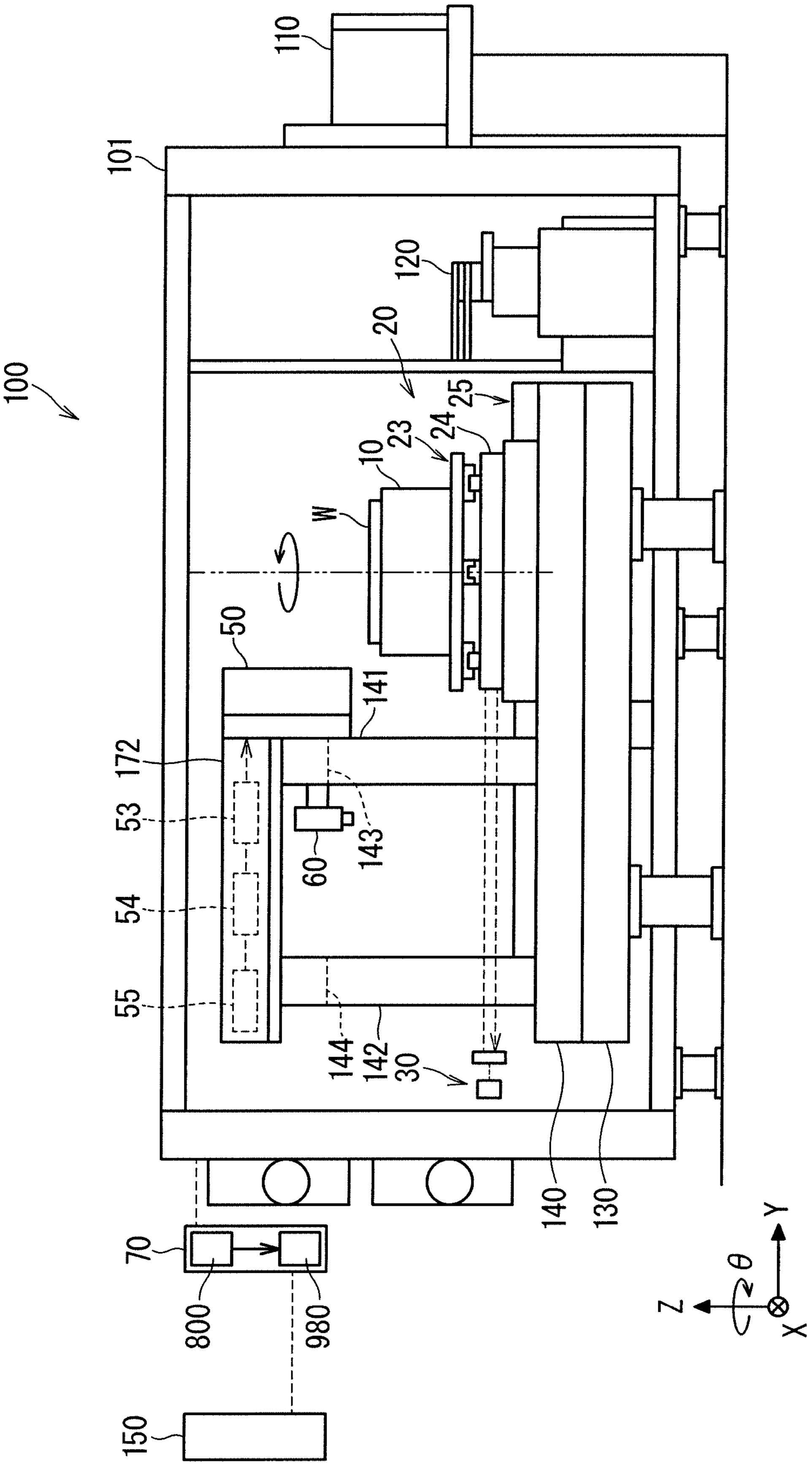
FIG. 1 is a side view schematically illustrating a configuration of a drawing system.

The following describes the embodiments with reference to the drawings. Note that, in the following drawings, the same or corresponding portions are denoted by the same reference numerals, and the description thereof will not be repeated.

1. Preliminary Description

Prior to a specific description of the embodiments, a preliminary description for facilitating understanding thereof will be described below.

1-1. Configuration of Drawing System

Figure 2:
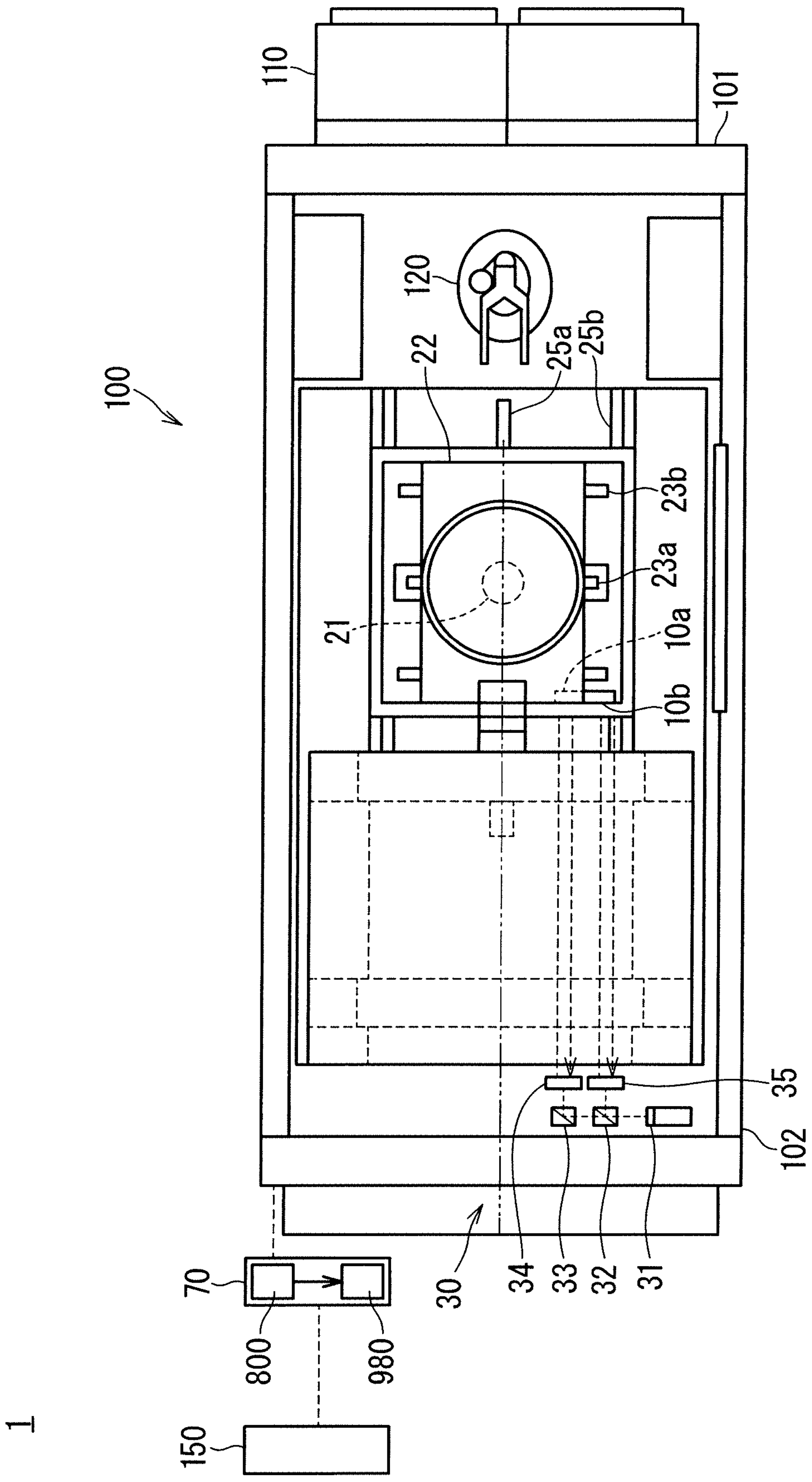
FIG. 2 is a plan view schematically illustrating the configuration of the drawing system.

FIGS. 1 and 2 are a side view and a plan view illustrating a configuration example of a drawing system 1, respectively. The drawing system 1 includes a drawing apparatus 100 having a control unit 70 and a basic computer-aided design (CAD) system 150. The basic CAD system 150 is connected to the control unit 70 of the drawing apparatus 100 via a communication line, and is configured to be able to exchange various data with the control unit 70. The basic CAD system 150 (FIG. 3) may be configured using a general system for wiring pattern design. The configuration of the drawing apparatus 100 will be described below.

The drawing apparatus 100 is a direct drawing apparatus that writes a pattern by irradiating a photosensitive resist layer provided on a substrate W with a light beam for photolithography on the substrate W. Another configuration may be interposed between the substrate W and the resist layer. The substrate W is for supporting a semiconductor chip (an electrical element) in a step of forming a redistribution layer on the semiconductor chip. Accordingly, the substrate W may be removed before a final product (typically a multi-chip module) including the semiconductor chip and the redistribution layer is completed. The substrate W is, for example, a semiconductor substrate or a glass substrate. The drawing apparatus 100 mainly includes a stage 10 that holds the substrate W, a stage moving mechanism 20 that moves the stage 10, a position parameter measuring mechanism 30 that measures a position parameter corresponding to the position of the stage 10, an optical head unit 50 that irradiates an upper surface of the substrate W with a pulsed light, an alignment camera 60 (a photographing unit), and the control unit 70.

The drawing apparatus 100 also includes a main body frame 101 and a cover 102 attached thereto. The main body frame 101, the cover 102, and members surrounded by them constitute a main body portion of the drawing apparatus 100. A substrate storing cassette 110 is arranged outside the main body portion. An untreated substrate W to be subjected to an exposure processing can be stored in the substrate storing cassette 110. The untreated substrate W is loaded into the main body portion by a transfer robot 120 arranged inside the main body portion. Further, after the exposure processing (a pattern drawing processing) is performed on the untreated substrate W, the substrate W is unloaded from the main body portion by the transfer robot 120 and returned to the substrate storing cassette 110.

A base 130 is arranged in the main body portion within an accessible range of the transfer robot 120. One end side region (a right hand side region in FIGS. 1 and 2) of the base 130 is a substrate transfer region where the substrate W is transferred to and from the transfer robot 120, and the other end side region (a left hand side region in FIGS. 1 and 2) is a pattern drawing region where a pattern drawing is performed on the substrate W. A head support unit 140 is provided on the base 130. The head support unit 140 includes two leg members 141 and two leg members 142 erected upward from the pattern drawing region of the base 130. Further, the head support unit 140 includes a beam member 143 that bridges the top portions of the two leg members 141, and a beam member 144 that bridges the tops of the two leg members 142. Then, the alignment camera 60 is fixed to a pattern drawing region side of the beam member 143. The alignment camera 60 photographs an upper surface side of the substrate W.

The stage 10 has a cylindrical outer shape in an XY plane. A plurality of suction holes (not illustrated) are formed in the upper surface of the stage 10. Thus, when the substrate W is placed in a horizontal posture on the upper surface of the stage 10, the substrate W is sucked and fixed to the upper surface of the stage 10 by a suction pressure of the plurality of suction holes. Thus, the substrate W is held by the stage 10. The stage 10 is moved on the base 130 in an X direction, a Y direction, and a θ direction by the stage moving mechanism 20. The θ direction is a direction rotating about a Z axis. The stage moving mechanism 20 two-dimensionally translates the stage 10 in the XY plane (a horizontal plane) and rotates the stage in the θ direction. Thus, the stage 10 moves relative to the optical head unit 50. By this relative movement, the stage moving mechanism 20 positions the stage 10 with respect to the optical head unit 50 to be described later.

The stage moving mechanism 20 is a mechanism for moving the stage 10 in a main scanning direction (a Y-axis direction), a sub-scanning direction (an X-axis direction), and a rotation direction (a rotation direction around the Z axis) with respect to the base 130 of the drawing apparatus 100. The stage moving mechanism 20 includes a rotation mechanism 21 that rotates the stage 10, a support plate 22 that rotatably supports the stage 10, a sub-scanning mechanism 23 that moves the support plate 22 in the sub-scanning direction, a base plate 24 that supports the support plate 22 via the sub-scanning mechanism 23, and a main scanning mechanism 25 that moves the base plate 24 in the main scanning direction. The rotation mechanism 21 includes a motor constituted by a rotor attached inside the stage 10. Further, a rotary bearing mechanism is provided between a center lower surface side of the stage 10 and the support plate 22. When the motor is operated, the rotor moves in the θ direction. Thus, the stage 10 rotates within a range of a predetermined angle about a rotation axis of the rotary bearing mechanism. The sub-scanning mechanism 23 includes a linear motor 23*a* and a pair of guide rails 23*b*. The linear motor 23*a* generates a propulsive force in the sub-scanning direction by a mover attached to a lower surface of the support plate 22 and a stator laid on an upper surface of the base plate 24. The pair of guide rails 23*b* guides the support plate 22 along the sub-scanning direction with respect to the base plate 24. With the configuration above, when the linear motor 23*a* operates, the support plate 22 and the stage 10 move in the sub-scanning direction along the guide rails 23*b* on the base plate 24. The main scanning mechanism 25 includes a linear motor 25*a* and a pair of guide rails 25*b*. The linear motor 25*a* generates a propulsive force in the main scanning direction by a mover attached to a lower surface of the base plate 24 and a stator laid on an upper surface of the head support unit 140. The pair of guide rails 25*b* guides the base plate 24 along the main scanning direction with respect to the head support unit 140. With the configuration above, when the linear motor 25*a* operates, the base plate 24, the support plate 22, and the stage 10 move in the main scanning direction along the guide rails 25*b* on the base 130. As such a stage moving mechanism 20, an X-Y-θ axis moving mechanism that has been frequently used conventionally can be used.

The position parameter measuring mechanism 30 measures the position parameter of the stage 10 using an interference of laser light. The position parameter measuring mechanism 30 mainly includes a laser light emitting unit 31, a beam splitter 32, a beam vendor 33, a first interferometer 34, and a second interferometer 35. The laser light emitting unit 31 is a light source apparatus for emitting laser light for measurement (see dashed lines in the drawings). The laser light emitting unit 31 is installed at a fixed position (a position fixed with respect to the base 130). A laser light emitted from the laser light emitting unit 31 first enters the beam splitter 32 and is split into a first split light from the beam splitter 32 toward the beam vendor 33 and a second split light from the beam splitter 32 toward the second interferometer 35. The first split light is reflected by the beam vendor 33, is incident on the first interferometer 34, and is emitted from the first interferometer 34 to a first portion (here, a central portion of an end side on a −Y side) 10*a* of the end side on the −Y side of the stage 10. Then, the first split light reflected by the first portion 10*a* is incident on the first interferometer 34 again. The first interferometer 34 measures a position parameter corresponding to the position of the first portion 10*a* of the stage 10 based on an interference between the first split light traveling toward the stage 10 and the first split light reflected from the stage 10. On the other hand, the second split light enters the second interferometer 35, and is emitted from the second interferometer 35 to a second portion (a portion different from the first portion 10*a*) 10*b* of the end side on the −Y side of the stage 10. Then, the second split light reflected by the second portion 10*b* is incident on the second interferometer 35 again. The second interferometer 35 measures a position parameter corresponding to the position of the second portion 10*b* of the stage 10 based on an interference between the second split light traveling toward the stage 10 and the second split light reflected from the stage 10. The first interferometer 34 and the second interferometer 35 transmit the position parameters acquired by the respective measurements to the control unit 70. The control unit 70 controls a position and a moving speed of the stage 10 using the position parameters.

The optical head unit 50 has a fixed relative position with respect to the alignment camera 60 in the XY plane. Further, the optical head unit 50 is attached movably in a Z direction (a vertical direction) with respect to the head support unit 140 by a head moving mechanism (not illustrated). As the optical head unit 50 moves in the vertical direction, a distance between the optical head unit 50 and the substrate W on the stage 10 is adjusted with high accuracy. A box 172 accommodating an optical system of the optical head unit 50 and the like is provided so as to bridge the tops of the beam members 143 and 144. The box 172 covers the pattern drawing region of the base 130 from above.

The optical head unit 50 irradiates the upper surface of the substrate W held on the stage 10 with the pulsed light for the exposure processing in order to perform pattern drawing on the photosensitive resist layer on the substrate W. Accordingly, the optical head unit 50 can expose the substrate W without using an exposure mask. More specifically, the optical head unit 50 directly exposes the photosensitive resist layer on the substrate W placed on the stage 10 based on the drawing data generated by a wiring data generation apparatus 800. The optical head unit 50 is attached to the beam member 143, and the beam member 143 is bridged so as to straddle the stage 10 and the stage moving mechanism 20 above the base 130. The optical head unit 50 is arranged at a substantially central portion of the base 130 in the Y direction. The optical head unit 50 is connected to one laser oscillator 54 via an illumination optical system 53. A laser driving unit 55 that drives the laser oscillator 54 is connected to the laser oscillator 54. The laser oscillator 54 emits lights having a wavelength included in a wavelength band in which the photosensitive resist layer is exposed. The photosensitive resist layer typically has a photosensitivity to ultraviolet rays, and in this case, the laser oscillator 54 is, for example, a triple wave solid-state laser that emits ultraviolet rays having a wavelength of 355 nm. The laser driving unit 55, the laser oscillator 54, and the illumination optical system 53 are provided inside the box 172. When the laser driving unit 55 operates, the pulsed light is emitted from the laser oscillator 54, and the pulsed light is introduced into the optical head unit 50 via the illumination optical system 53.

In the optical head unit 50, a spatial light modulator that spatially modulates emitted lights, a drawing control unit that controls the spatial light modulator, an optical system that emits a pulsed light introduced into the optical head unit 50 toward the upper surface of the substrate W via the spatial light modulator, and the like (not illustrated respectively) are mainly provided. As the spatial light modulator, for example, a Grating Light Valve (GLV (registered trademark)) which is a diffraction grating type spatial light modulator or the like is adopted. The pulsed light introduced into the optical head unit 50 is emitted toward the upper surface of the substrate W as a light flux formed into a predetermined pattern shape by the spatial light modulator or the like. As a result, the photosensitive resist layer on the substrate W is exposed. Thus, a pattern is drawn on the upper surface of the substrate W. The patterns can be formed on the entire drawing region of the substrate W by repeating the drawing of the pattern in the main scanning direction for a predetermined number of times while shifting the substrate W in the sub-scanning direction in an exposure width by the optical head unit 50.

By photographing the substrate W, the alignment camera 60 generates a monitor image including images such as alignment marks (not illustrated) formed in advance at a plurality of locations on the upper surface of the substrate W and alignment marks formed on the upper surface of the semiconductor chip arranged on the substrate W. The monitor image is used for detecting the position and angle of the substrate W and detecting the position and angle of the semiconductor chip. The alignment camera 60 can also photograph a wiring pattern such as electrodes covered in the photosensitive resist layer. The alignment camera 60 includes, for example, a digital camera, and is fixed to the base 130 via the beam member 143.

In order for the alignment camera 60 to photograph the alignment marks, first, the stage 10 moves to a position on the farthest −Y side (a left side position in FIGS. 1 and 2). Then, the alignment camera 60 acquires the monitor image including images of alignment marks while a monitor illumination unit (not illustrated) irradiates the substrate W with a monitor illumination light. The acquired monitor image is transmitted from the alignment camera 60 to the control unit 70. The transmitted monitor image is used by the control unit 70 for adjustment of the position and angle of the substrate W with respect to the optical head unit 50, detection of the arrangement error of the semiconductor chip with respect to the predetermined reference position and reference angle, and the like.

When the electrodes of the semiconductor chip arranged on the substrate W are irradiated with the monitor illumination light, infrared light components of the reflected light thereof enter the alignment camera 60. Since the infrared light components can pass through the photosensitive resist layer with almost no contribution to photosensitivity, the alignment camera 60 having a sensitivity in an infrared region can photograph the electrodes covered in the photosensitive resist layer. Therefore, the monitor illumination light preferably contains a large amount of infrared light components. Thus, the arrangement of the electrodes of the semiconductor chip can be directly measured. In addition, instead of such direct measurement, the arrangement of the semiconductor chip is measured by detecting the alignment marks, and then the arrangement of the electrodes can be indirectly measured by referring to the design data of the arrangement of the electrodes in the semiconductor chip.

The control unit 70 is an information processing unit for controlling operations of each unit in the drawing apparatus 100 while executing various arithmetic processing. The control unit 70 includes the wiring data generation apparatus

800 and an exposure control unit 980. The wiring data generation apparatus 800 generates wiring data indicating the wiring provided in the redistribution layer of the semiconductor chip. Using the wiring data, the exposure control unit 980 controls the stage moving mechanism 20, the optical head unit 50, and the like, thereby performing the exposure processing directly.

Figure 3:
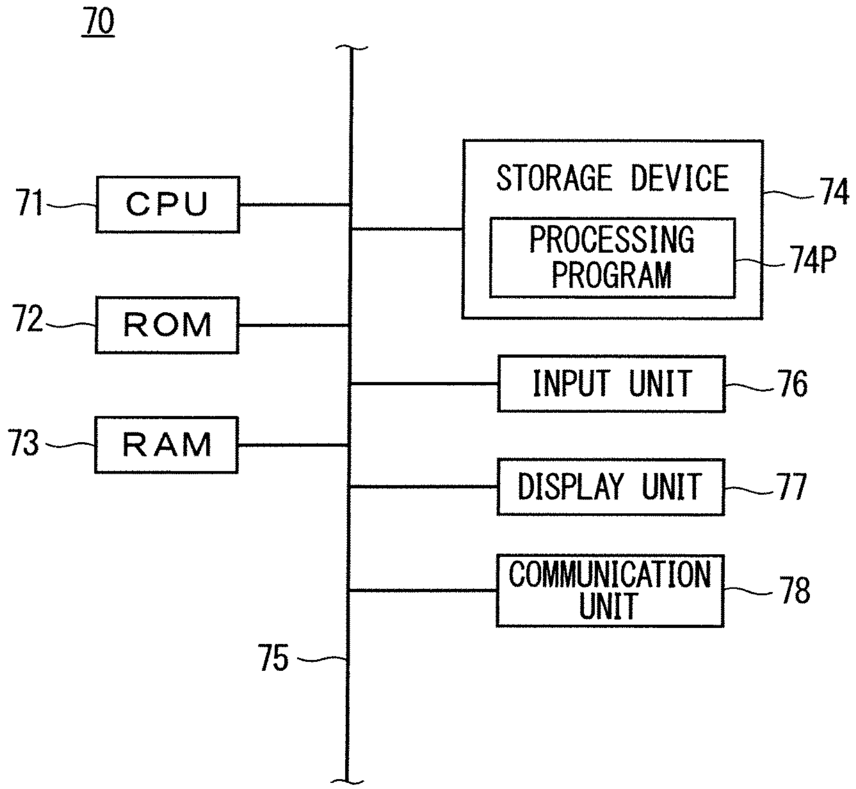
FIG. 3 is a block diagram schematically illustrating a configuration of a control unit of a drawing apparatus included in the drawing system.

Referring to FIG. 3, the control unit 70 may be configured of one or more general computers having an electric circuit. In a case where a plurality of computers are used, the computers are communicably connected to each other. The control unit 70 may be arranged in one electric rack (not illustrated). Specifically, the control unit 70 includes a central processing unit (CPU) 71, a read only memory (ROM) 72, a random access memory (RAM) 73, a storage device 74, an input unit 76, a display unit 77, a communication unit 78, and a bus line 75 that interconnects these components. The ROM 72 stores a basic program. The RAM 73 is used as a work region when the CPU 71 performs predetermined processing. The storage device 74 includes a non-volatile storage device such as a flash memory or a hard disk device. The input unit 76 includes various switches, a touch panel, or the like, and receives an input setting instruction such as a processing recipe from an operator. The display unit 77 includes, for example, a liquid crystal display and a lamp, and displays various types of information under the control of the CPU 71. The communication unit 78 has a data communication function via a local area network (LAN) or the like. In the storage device 74, a plurality of modes for control of each configuration in the drawing apparatus 100 are set in advance. When the CPU 71 executes a processing program 74P, one of the plurality of modes is selected, and each configuration is controlled in the mode. In addition, the processing program 74P may be stored in a recording medium. By using this recording medium, the processing program 74P can be installed in the control unit 70. Further, some or all of the functions executed by the control unit 70 are not necessarily realized by software, and may be realized by hardware such as a dedicated logic circuit.

Figure 4:
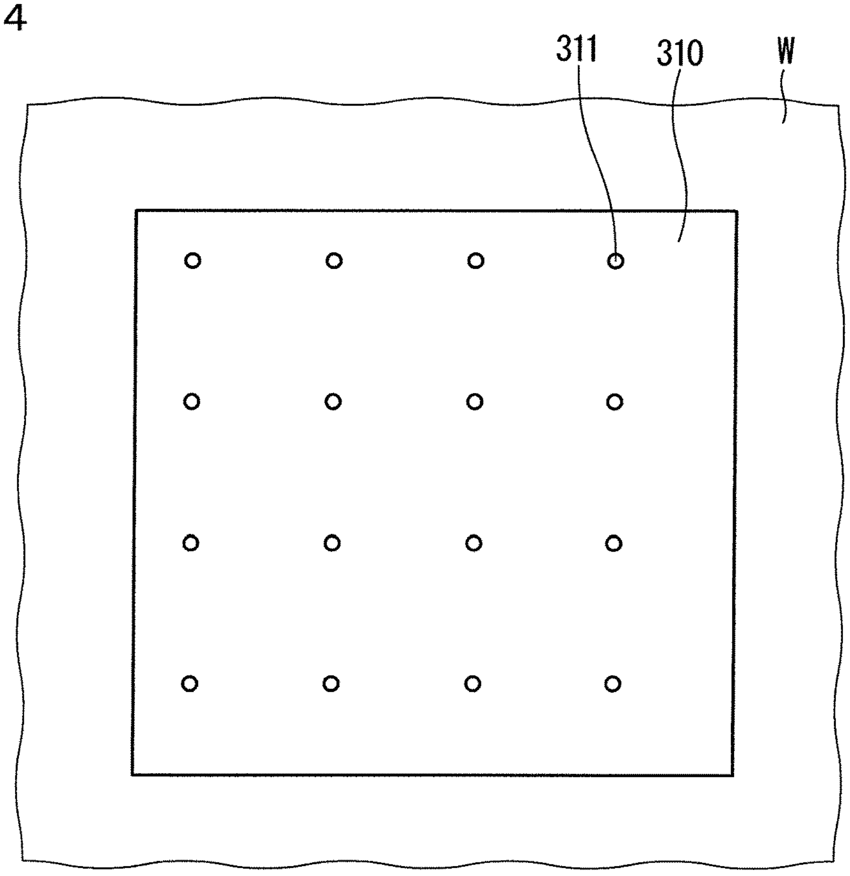
FIG. 4 is a partial plan view schematically illustrating a first step of a formation example of a redistribution layer in a case where an arrangement position of an electrical element is accurate.

1-2. Formation Example of Redistribution Layer in Case where Chip Arrangement Position is Accurate Referring to FIG. 4, a semiconductor chip 310 (the electrical element) is arranged at a predetermined position on the substrate W by a bonder. In this example, it is assumed that there is no error in arrangement. In addition, although only one semiconductor chip 310 is illustrated in FIG. 4, in mass production, a plurality of semiconductor chips 310 are usually arranged at different positions in an in-plane direction on the substrate W. The semiconductor chip 310 has electrodes 311 (the element electrodes) on a front surface (a surface illustrated in FIG. 4). In the illustrated example, the electrodes 311 have a circular shape, and a diameter is, for example, about 25 μm. Next, according to the following process, the redistribution layer is formed on the substrate W on which the semiconductor chip 310 is arranged.

Figure 5:
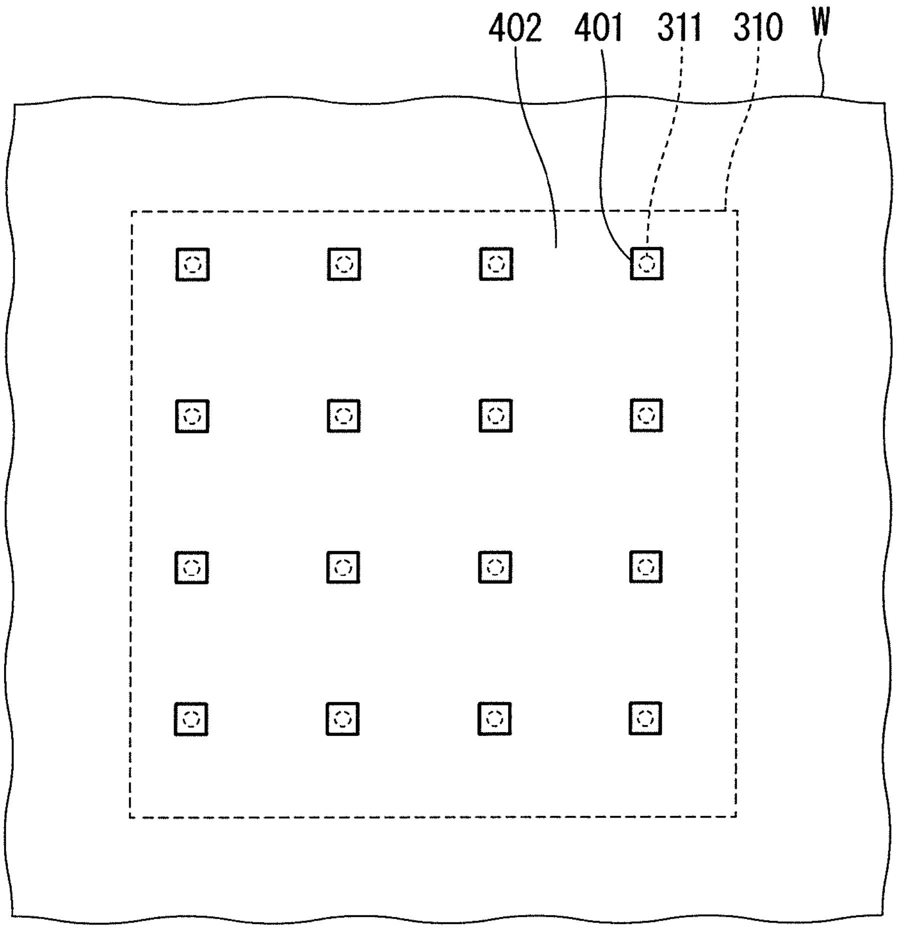
FIG. 5 is a partial plan view schematically illustrating a second step of the formation example of the redistribution layer in a case where the arrangement position of the electrical element is accurate.

Referring to FIG. 5, an interlayer insulating film 402 and vias 401 penetrating the interlayer insulating film 402 are formed as a lower layer of the redistribution layer. The vias 401 are made of metal and are arranged on the electrodes 311. In the illustrated example, the vias 401 have a square shape, and one side thereof is, for example, about 45 μm. In order to impart the illustrated pattern shape with the vias 401, photolithography using the exposure processing by the drawing system 1 is performed.

Figure 6:
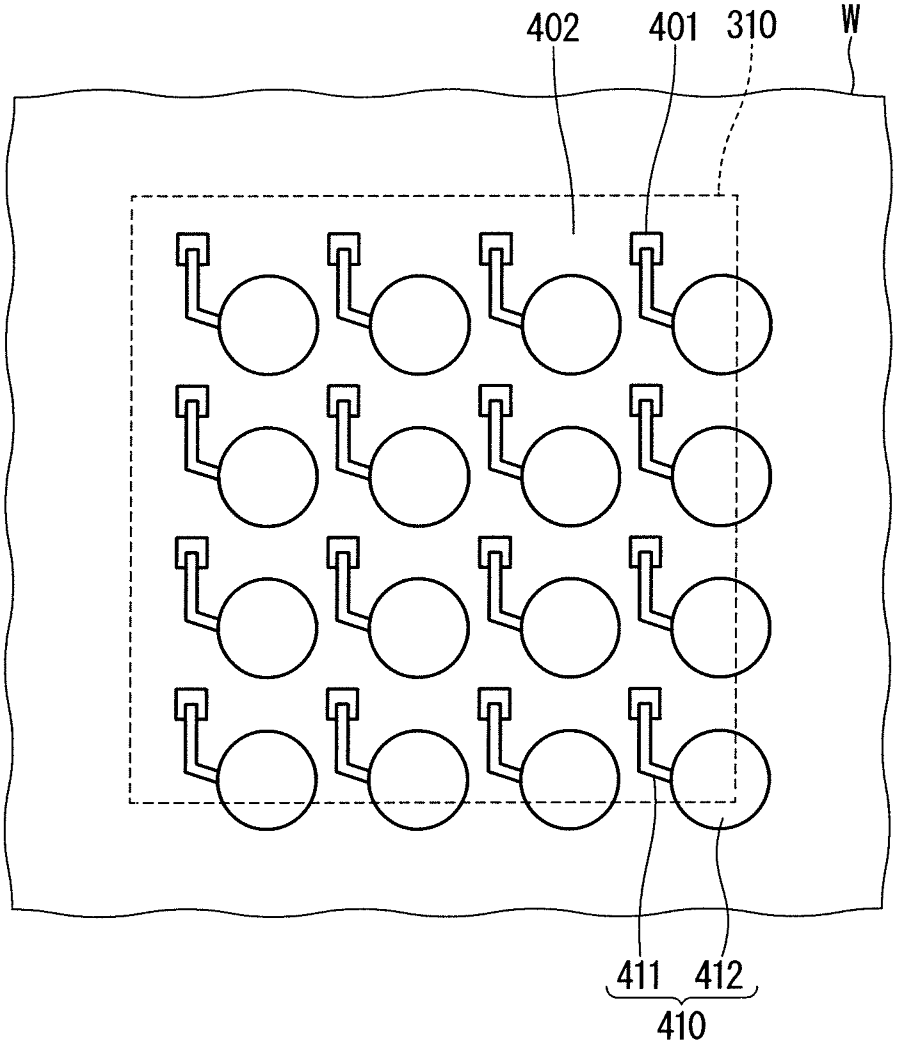
FIG. 6 is a partial plan view schematically illustrating a third step of the formation example of the redistribution layer in a case where the arrangement position of the electrical element is accurate.
Figure 7:
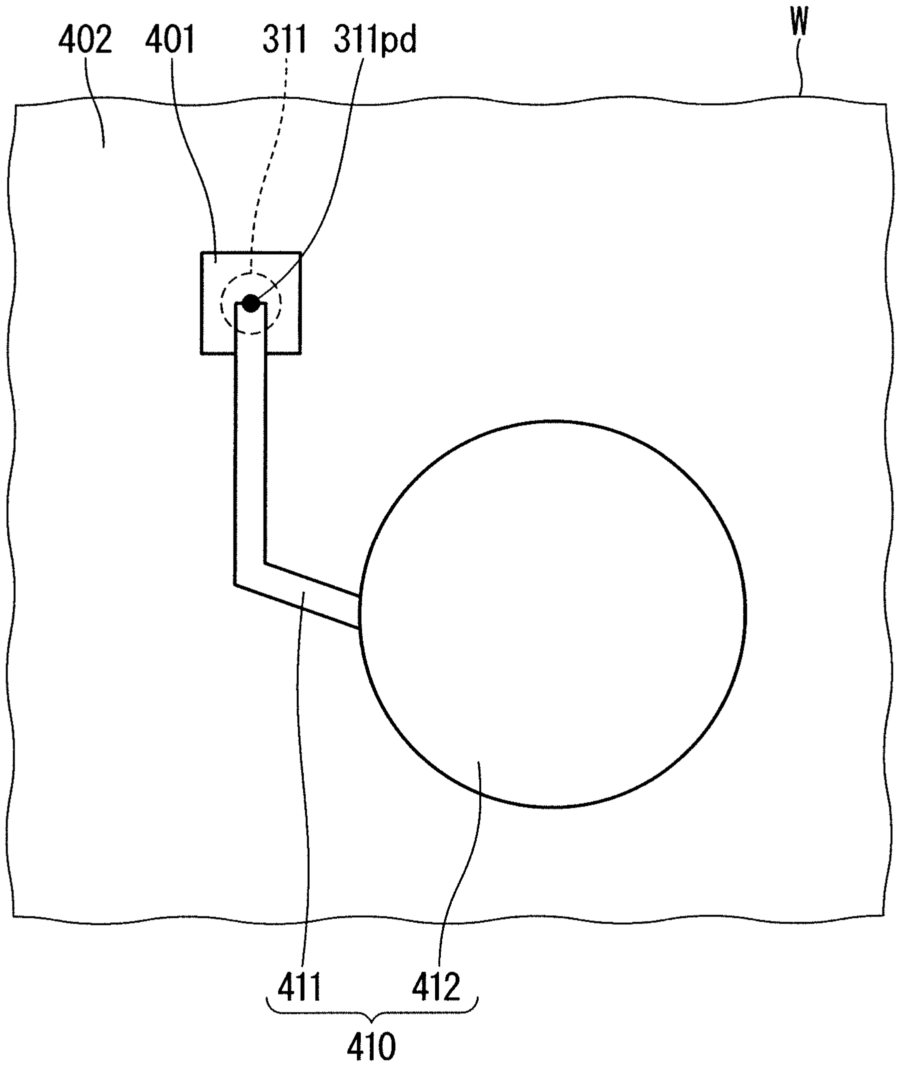
FIG. 7 is a partially enlarged view of FIG. 6.

Referring to FIG. 6, a metal layer 410 including wiring 411 and solder pads 412 is formed as a middle layer of the redistribution layer. Each piece of the wiring 411 has one end in contact with the via 401 and the other end in contact with the solder pad 412. A width dimension (a dimension in a direction orthogonal to an extending direction) of the wiring 411 is, for example, about 15 μm or more and about 20 μm or less. In order to impart the metal layer 410 with the illustrated pattern shape, the photolithography using the exposure processing by the drawing system 1 is performed. The solder pads 412 are arranged so as to at least partially overlap with the semiconductor chip 310 in a plan view. Specifically, at least one of the plurality of solder pads 412 is arranged so as to overlap with the semiconductor chip 310 in the plan view. FIG. 7 is a partially enlarged view of FIG. 6. In this example, since the arrangement of the semiconductor chip 310 (FIG. 6) is accurate, each of the electrodes 311 of the semiconductor chip 310 is located at a design position 311*pd*. Then, the via 401 and the wiring 411 are formed correspondingly. The design position 311*pd* is a representative position in terms of design of the electrode 311, and may be, for example, a center position in terms of design of the electrode 311.

Figure 8:
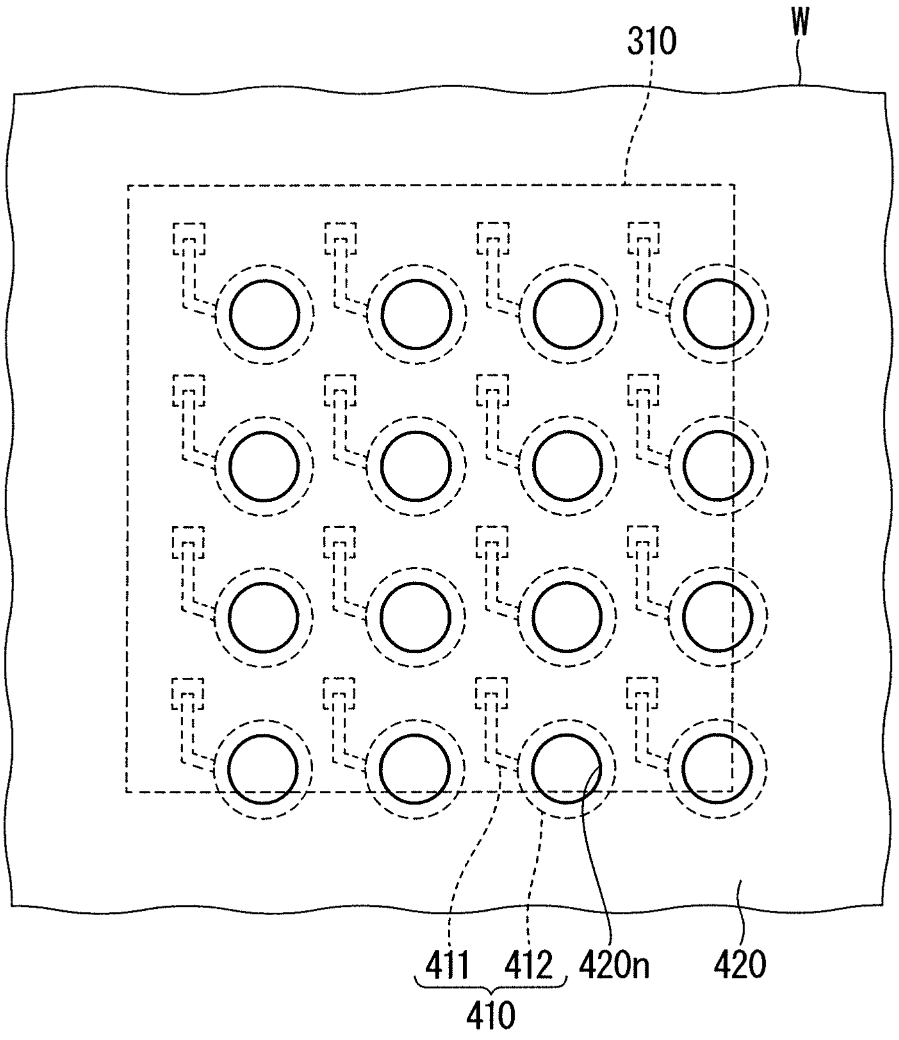
FIG. 8 is a partial plan view schematically illustrating a fourth step of the formation example of the redistribution layer in a case where the arrangement position of the electrical element is accurate.

Referring to FIG. 8, a covering insulating film 420 is formed as an upper layer of the redistribution layer. The covering insulating film 420 has opening portions 420*n* that partially expose the solder pads 412. Thus, the redistribution layer including the vias 401, the interlayer insulating film 402, the metal layer 410, and the covering insulating film 420 is obtained. In other words, a formation of the redistribution layer is completed according to the processing so far.

Figure 9:
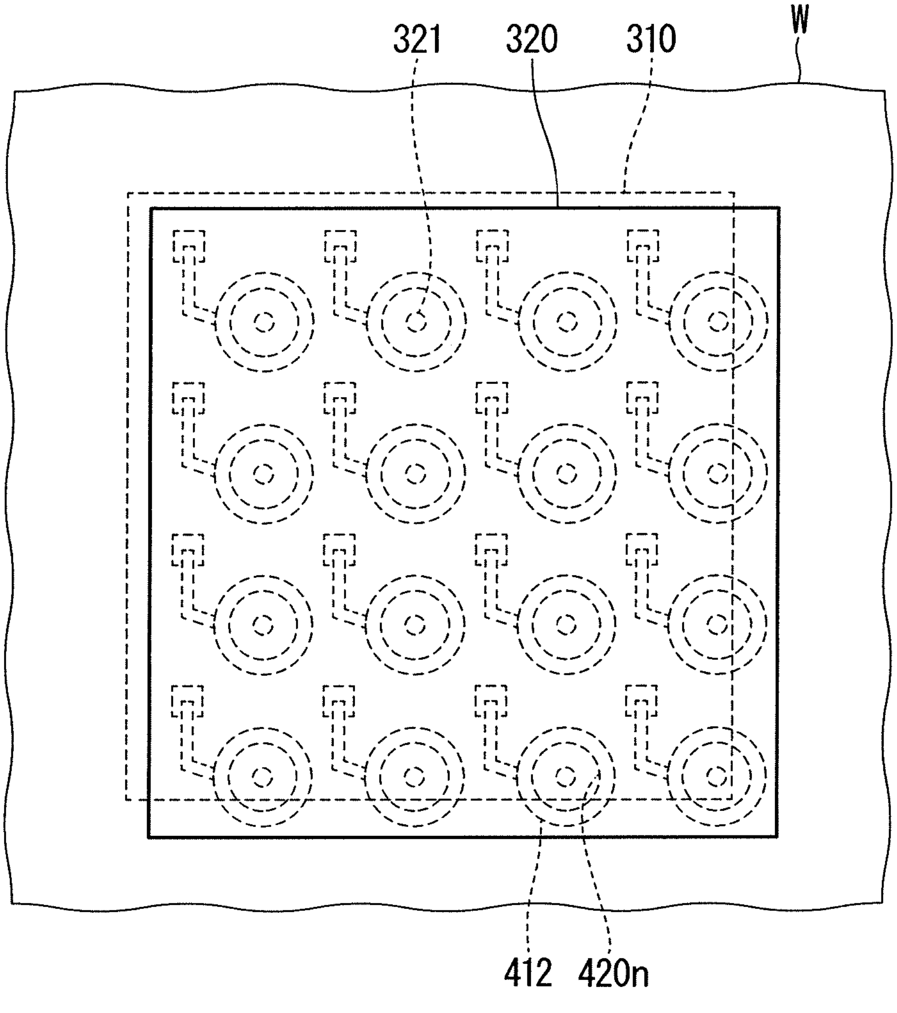
FIG. 9 is a partial plan view schematically illustrating a fourth step of the formation example of the redistribution layer in a case where the arrangement position of the electrical element is accurate.

Next, an example of a usage mode of the redistribution layer formed as described above will be described below. First, solder balls (not illustrated) are mounted on the solder pads 412 in the opening portions 420*n*. Referring to FIG. 9, a component 320 is mounted on the redistribution layer with the solder balls interposed therebetween. Thus, the solder balls are connected to electrodes 321 (connection destination electrodes) of the component 320. In other words, the electrodes 321 and the solder pads 412 are connected to each other via the solder balls. At the time of this connection, in the plan view, each of the electrodes 321 is arranged so as to at least partially overlap with the corresponding solder pad 412. Here, for example, the component 320 is a semiconductor chip, and the electrodes 321 are pad electrodes of the semiconductor chip. The electrodes 321 (the connection destination electrodes for the electrodes 311 (FIG. 5)) are arranged so as to at least partially overlap with the semiconductor chip 310 in the plan view. Specifically, at least one of the plurality of electrodes 321 is arranged so as to overlap with the semiconductor chip 310 in the plan view. In the example illustrated in FIG. 9, all the electrodes 321 are arranged so as to overlap with the semiconductor chip 310 in the plan view, but as modifications, only some of the plurality of electrodes 321 may be arranged so as to overlap with the semiconductor chip 310.

Based on the above, a laminate in which the semiconductor chip 310 and the component 320 are stacked on the substrate W with the redistribution layer interposed therebetween can be obtained. The semiconductor chip 310 and the component 320 are stacked so as to at least partially overlap in the planar layout. The electrodes 311 of the semiconductor chip 310 and the electrodes 321 of the component 320 are electrically connected to each other by the redistribution layer. After that, the substrate W may be removed. When a plurality of laminates are formed on the substrate W, the plurality of laminates can be obtained at a time.

1-3. Formation Example of Redistribution Layer Having Defect Due to Chip Arrangement Error Next, the following describes a case where, when there is a non-negligible arrangement error in the semiconductor chip 310, the redistribution layer is formed in the same method as described above without correcting the arrangement error. Note that this example is a comparative example with respect to the embodiments to be described later.

Figure 10:
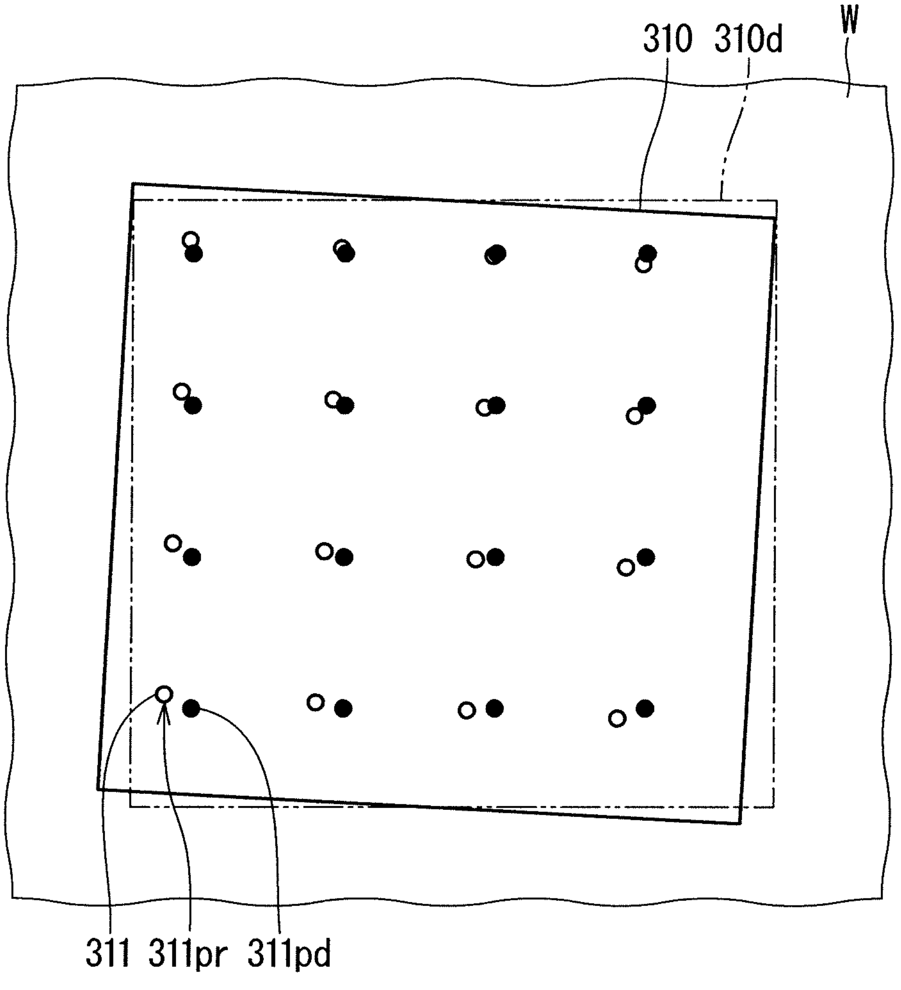
FIG. 10 is a partial plan view schematically illustrating a first step of a formation example of a redistribution layer that will have a defect due to an arrangement error of the electrical element.

Referring to FIG. 10, the semiconductor chip 310 (a first electrical element) is arranged at a predetermined position 310*d* on the substrate W by the bonder. Here, it is assumed that there is an error in this arrangement. As a result, the position of the semiconductor chip 310 has an error with respect to the predetermined position 310*d*. Correspondingly, actual positions 311*pr* of the electrodes 311 of the semiconductor chip 310 have errors with respect to the design positions 311*pd*. Main causes of the errors of the actual positions 311*pr* with respect to the design positions 311*pd* may be a mounting error when the semiconductor chip 310 is mounted on the substrate W, and thermal expansion and contraction in the substrate W to which the semiconductor chip 310 and the like are attached. Although only one semiconductor chip 310 is illustrated in FIG. 10, a plurality of semiconductor chips 310 are arranged at different positions in the in-plane direction on the substrate W in the mass production. Next, according to the following process, the redistribution layer is formed on the substrate W on which the semiconductor chip 310 is arranged.

Figure 11:
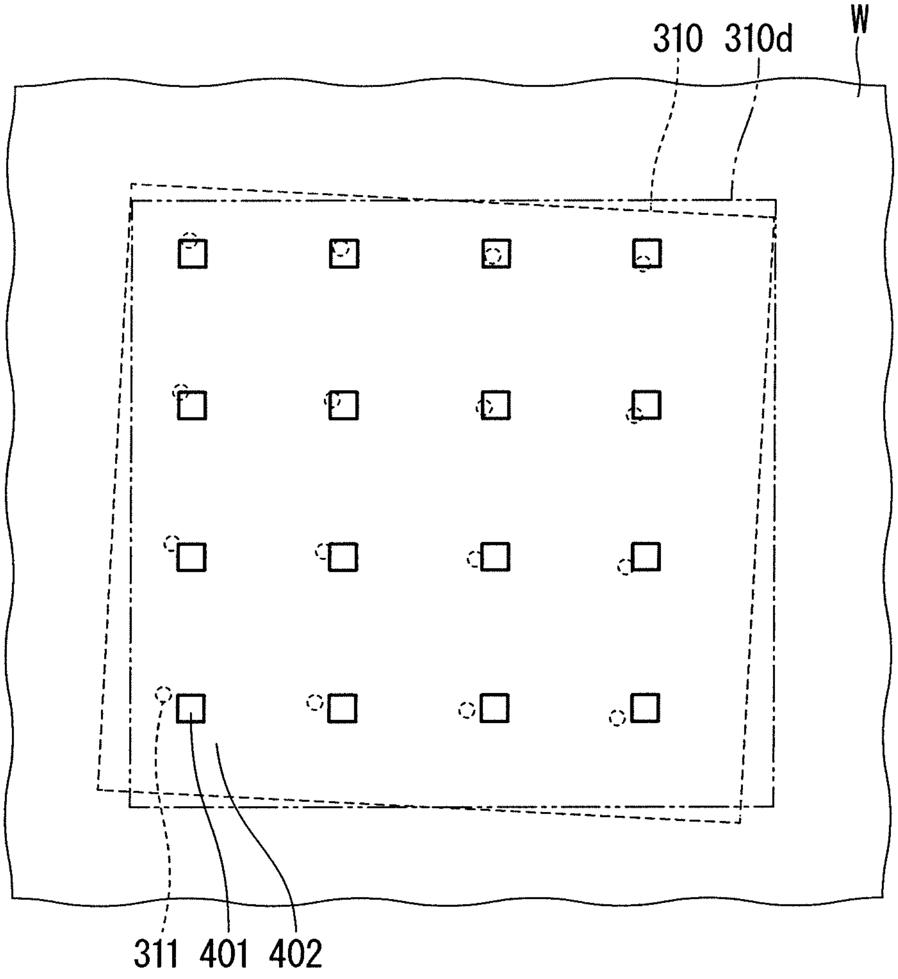
FIG. 11 is a partial plan view schematically illustrating a second step of the formation example of the redistribution layer that will have a defect due to the arrangement error of the electrical element.

Referring to FIG. 11, the interlayer insulating film 402 and the vias 401 penetrating the interlayer insulating film 402 are formed as a lower portion of the redistribution layer. In order to impart the illustrated pattern shape with the vias 401, photolithography using the exposure processing by the drawing system 1 is performed. This exposure processing is performed ignoring the arrangement errors of the electrodes 311 of the semiconductor chip 310. Due to the errors, the vias 401 are shifted from the electrodes 311, and as a result, both are not electrically connected.

Figure 12:
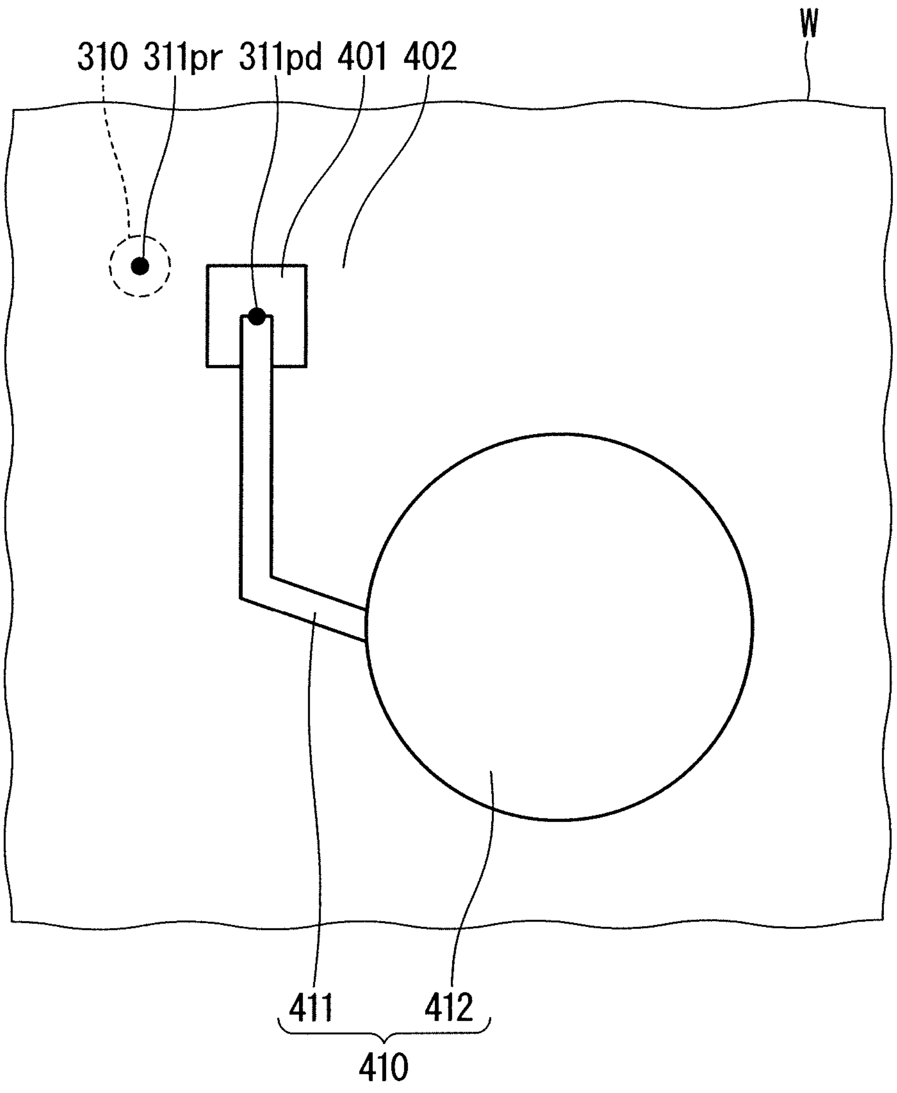
FIG. 12 is a partial plan view schematically illustrating a third step of the formation example of the redistribution layer that will have a defect due to the arrangement error of the electrical element.

Referring to FIG. 12, the metal layer 410 including the wiring 411 and the solder pad 412 is formed as a middle layer portion of the redistribution layer. In order to impart the metal layer 410 with the illustrated pattern shape, the photolithography using the exposure processing by the drawing system 1 is performed. Here, an overlapping error of photolithography is sufficiently smaller than the arrangement error of the semiconductor chip 310. Accordingly, the metal layer 410 is arranged sufficiently accurately with respect to the via 401. Here, as described above, the actual position 311*pr* of the electrode 311 has an error with respect to the design position 311*pd*, and as a result, the via 401 is not connected to the electrode 311. Therefore, the electrode 311 and the metal layer 410 are not electrically connected. Accordingly, in the present example, the redistribution layer has a defect.

2. Details of Embodiments

In order to avoid the above defect of the redistribution layer, in the present embodiments, the drawing system 1 has a feature described below in addition to the configuration described in the preliminary description above.

2-1. Configuration

Figure 13:
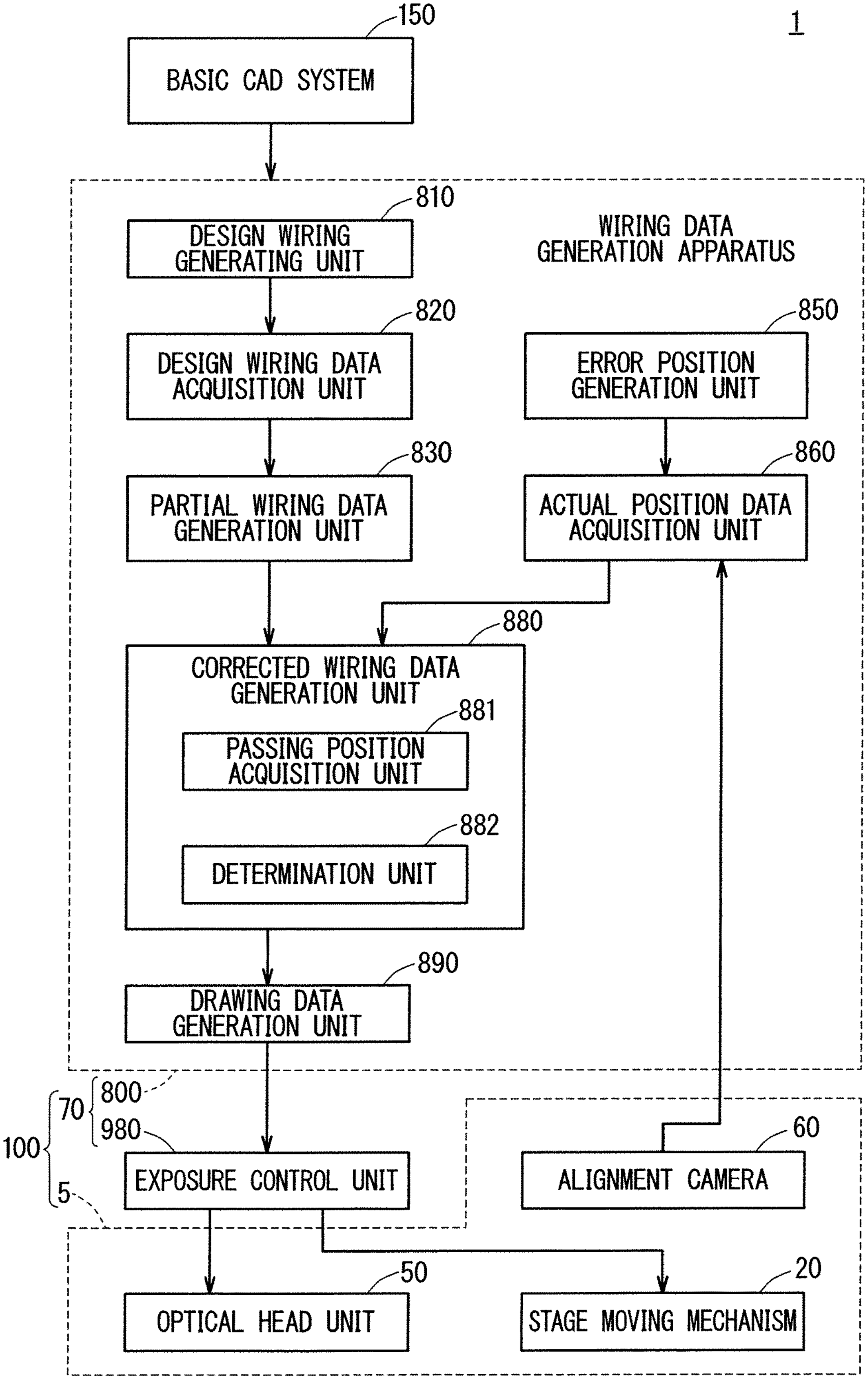
FIG. 13 is a block diagram schematically illustrating a configuration of the drawing system according to embodiments.

FIG. 13 is a block diagram schematically illustrating a functional configuration of the drawing system 1. As described in the preliminary description above, the drawing system 1 includes the basic CAD system 150 and the drawing apparatus 100. Further, the drawing apparatus 100 includes the control unit 70 and a functional component group 5. The control unit 70 includes the wiring data generation apparatus 800 and the exposure control unit 980. The exposure control unit 980 controls the functional component group 5. The functional component group 5 includes the stage moving mechanism 20, the optical head unit 50, and the alignment camera 60 described above.

The wiring data generation apparatus 800 generates data indicating the redistribution layer. In order to electrically connect the electrodes 311 (FIG. 4) of the semiconductor chip 310 arranged on the substrate W and the component 320 (FIG. 9) to be stacked on the semiconductor chip 310 in a stacking direction perpendicular to the planar layout so as to at least partially overlap with the semiconductor chip 310 in the planar layout, the redistribution layer is interposed between the semiconductor chip 310 and the component 320 in the stacking direction. As a part of the data generation, the wiring data generation apparatus 800 generates wiring data indicating the wiring 411 (FIG. 7). In order to enable this, the wiring data generation apparatus 800 includes a design wiring data acquisition unit 820, a partial wiring data generation unit 830, an actual position data acquisition unit 860, and a corrected wiring data generation unit 880.

Figure 14:
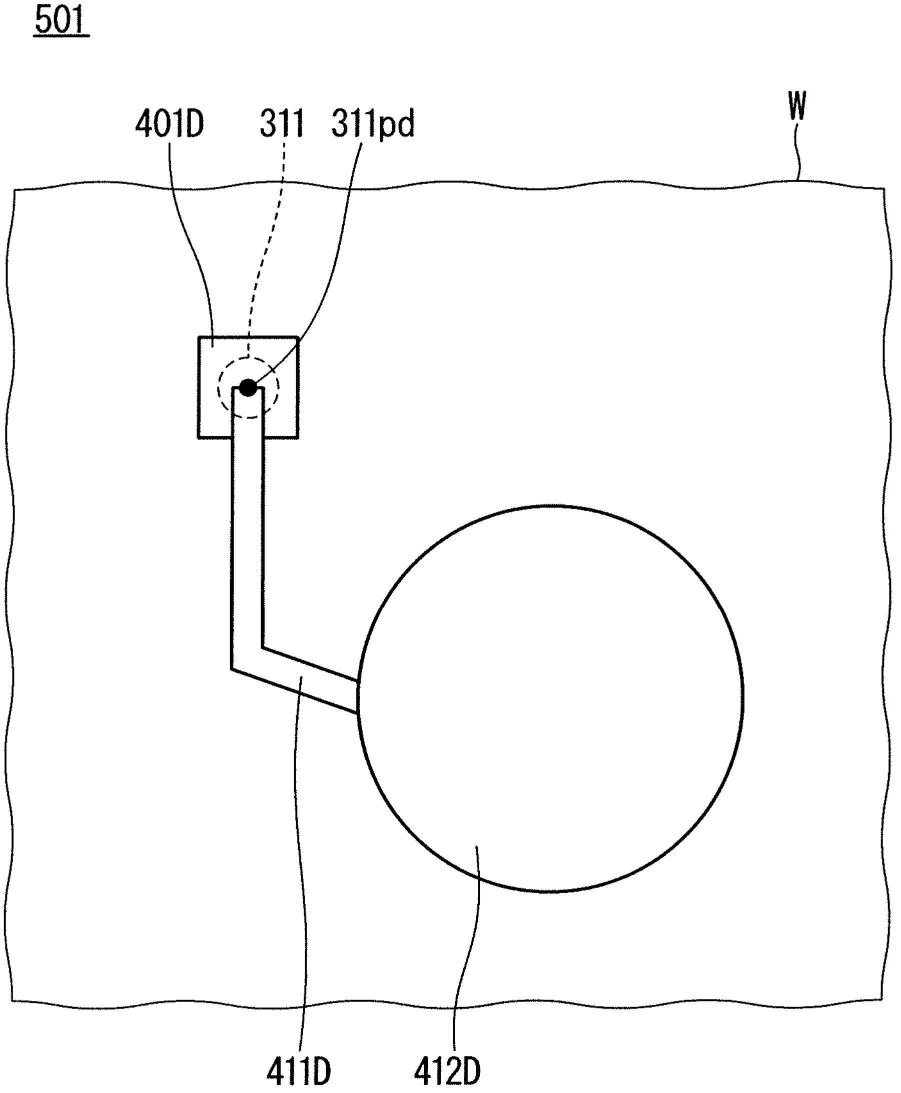
FIG. 14 is a partial plan view showing contents of design data according to the embodiments.

The design wiring data acquisition unit 820 (FIG. 13) acquires the design data that does not consider the arrangement error of the semiconductor chip 310 on the substrate W in order to form the redistribution layer. Specifically, as illustrated in FIG. 14, the design wiring data acquisition unit 820 acquires design wiring data 501 indicating a design via 401D, design wiring 411D, and a design solder pad 412D for connecting the electrode 311 (illustrated by a broken line for reference) at the design position 311*pd* on the substrate W and the electrode 321 (FIG. 9) of the component 320 to each other. The design wiring data 501 may be acquired from the basic CAD system 150, and in this case, a design wiring generating unit 810 may be omitted. Alternatively, the design wiring data 501 generated by the design wiring generating unit 810 may be acquired. In that case, the design wiring generating unit 810 generates the design wiring data 501 based on the design position 311*pd* of the electrode 311 of the semiconductor chip 310 and an assumed position where the electrode 321 of the component 320 is to be arranged. For this purpose, the design wiring generating unit 810 acquires, from the basic CAD system 150 or the control unit 70, information on the design position 311*pd* of the electrode 311 of the semiconductor chip 310, the assumed position where the electrode 321 of the component 320 is to be arranged, and the design position of the electrode 321 in the component 320. Then, based on this information, the design wiring data 501 is generated using a general automatic wiring technique.

Figure 15:
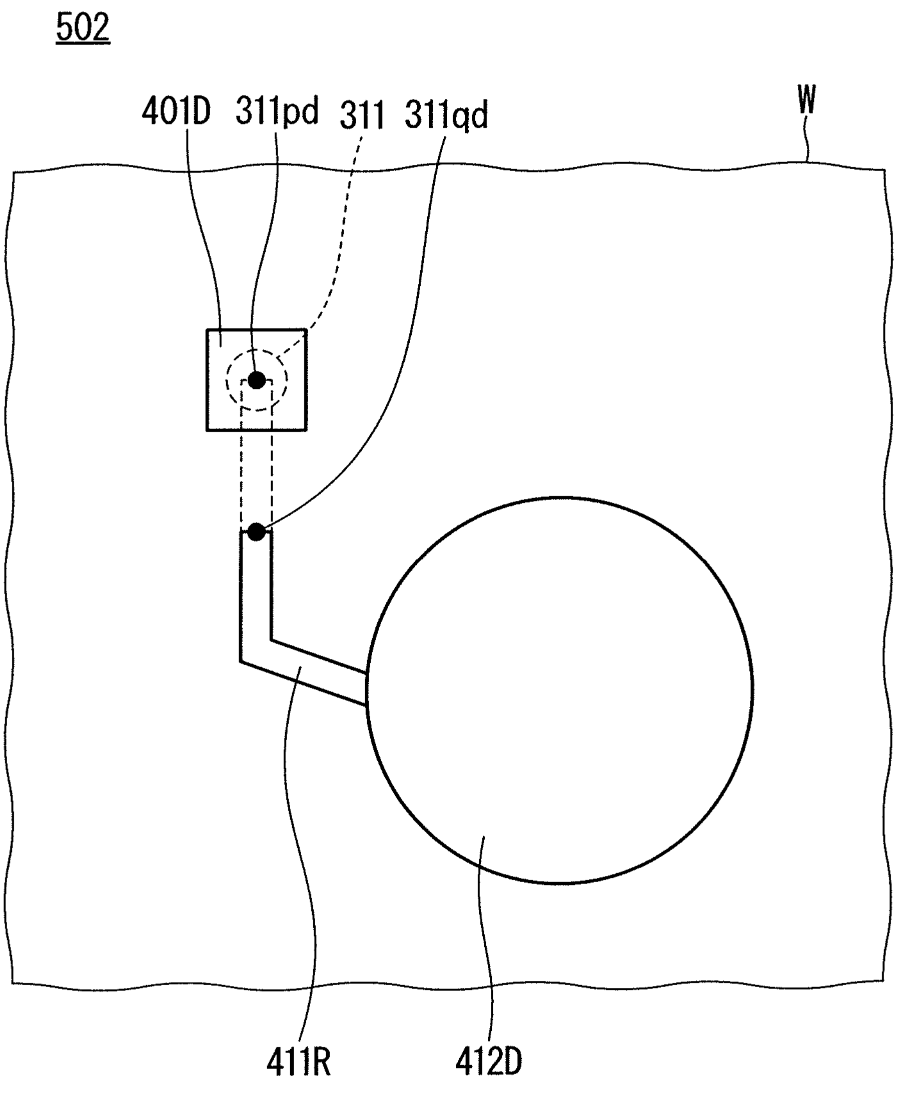
FIG. 15 is a partial plan view showing contents of partial wiring data according to the embodiments.

As illustrated in FIG. 15, the partial wiring data generation unit 830 (FIG. 13) generates partial wiring data 502 indicating partial wiring 411R obtained by deleting a peripheral portion of the design position 311*pd* of the electrode 311 in the design wiring 411D (FIG. 14). The partial wiring 411R has a connected position 311*qd* at a boundary with the peripheral portion removed as described above. Here, the "peripheral portion" is, for example, a portion included in a distance determined by the predetermined rules from the design position 311*pd*. This distance may be calculated from a dimension D in terms of design of the electrode 311. The dimension D is, for example, a diameter in a case where the electrode 311 has a circular shape, a length of one side in a case where the electrode 311 has a square shape, and a length of a short side or a long side in a case where the electrode 311 has a non-square rectangular shape. The distance is preferably D/4 or more, and more preferably D/2 or more. Further, the distance is preferably 5 D or less, and more preferably 3D or less. Alternatively, the control unit 70 may receive information on the distance from outside. In a case where about a dimension E is assumed as a magnitude of a misalignment of the electrode 311, the distance may be calculated from the dimension E, and specifically, may be calculated by multiplying E by a constant (for example, about 1.5).

Figure 16:
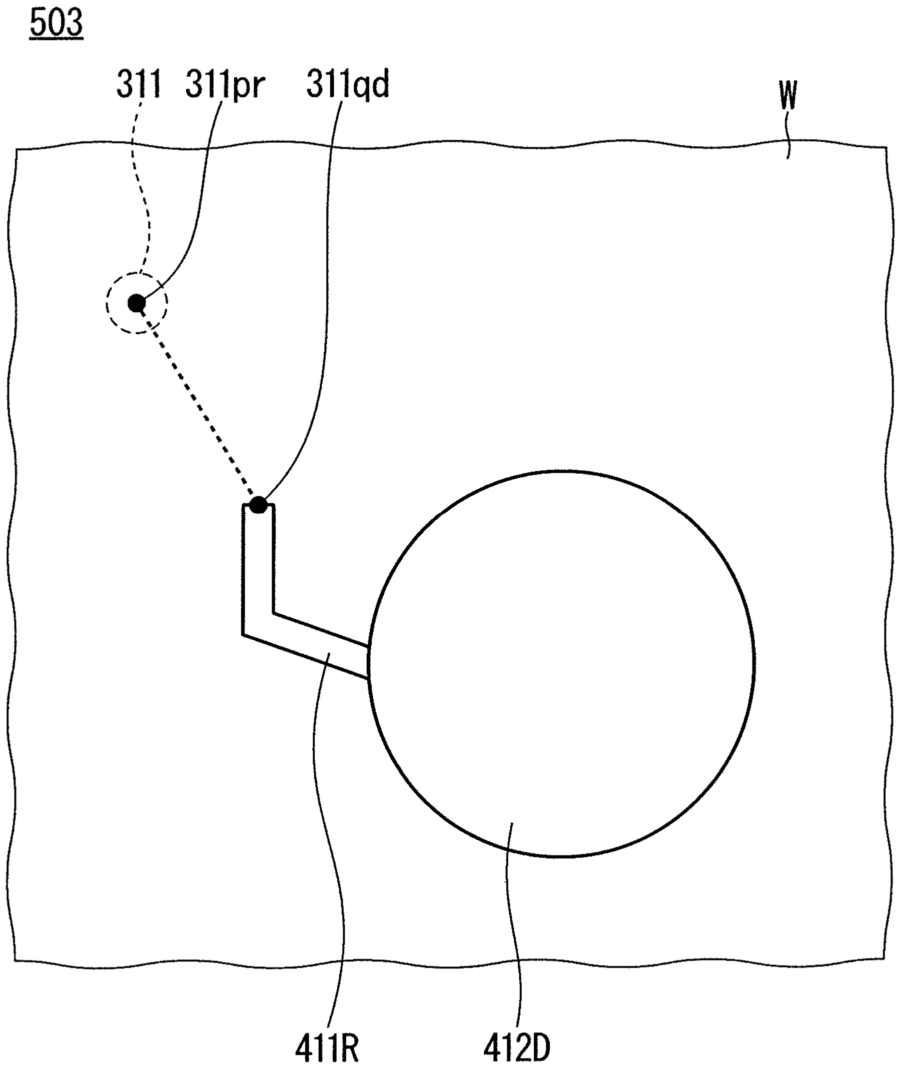
FIG. 16 is a partial plan view showing contents of actual position data according to the embodiments.

As illustrated in FIG. 16, the actual position data acquisition unit 860 (FIG. 13) acquires actual position data 503 indicating the actual position 311*pr* of the electrode 311 of the semiconductor chip 310 on the substrate W held by the stage 10 (FIG. 1). Specifically, the actual position data acquisition unit 860 calculates the actual position 311*pr* of the electrode 311 from the monitor image obtained by photographing the semiconductor chip 310 with the alignment camera 60. The calculation may be performed from a measurement result of the alignment marks of the semiconductor chip 310, or may be performed from the measurement result of the electrode 311 itself. In addition, the position in the monitor image may be detected based on, for example, an edge signal obtained by second-order differentiation of a pixel value distribution.

In FIG. 16, the broken line between the actual position 311*pr* of the electrode 311 and the connected position 311*qd* of the partial wiring 411R connected to the design solder pad 412D indicates a connection relationship defined in a netlist. The netlist is predetermined as one piece of design information. The netlist may be provided from the basic CAD system 150 (FIG. 13), or may be received by the control unit 70 from outside.

Figure 17:
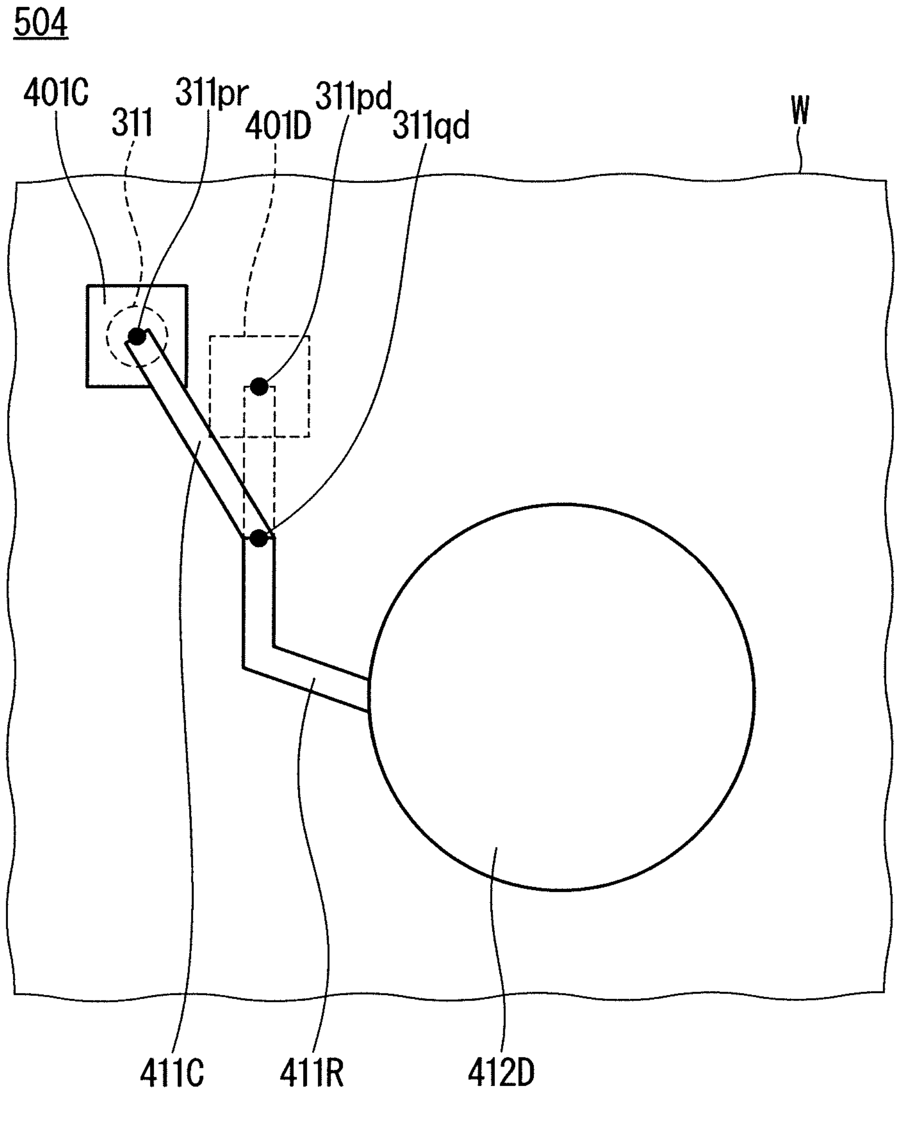
FIG. 17 is a partial plan view showing contents of corrected wiring data according to the embodiments.

As illustrated in FIG. 17, the corrected wiring data generation unit 880 (FIG. 13) shifts the position of the design via 401D (FIG. 14) from the design position 311*pd* (FIG. 14) to the actual position 311*pr* (FIG. 17) to generate corrected wiring data 504 (FIG. 17) indicating a corrected via 401C. Further, as illustrated in FIG. 17, the corrected wiring data generation unit 880 (FIG. 13) generates the corrected wiring data 504 indicating corrected wiring 411C that connects the partial wiring 411R and the electrode 311 (illustrated by the broken line for reference) at the actual position 311*pr* to each other through the corrected via 401C. For example, the actual position 311*pr* and the connected position 311*qd* to be electrically connected to each other are selected based on the netlist (see the broken line in FIG. 16), and data of the corrected wiring 411C linearly connecting these positions is generated. By making the generated pattern shape linear, the calculation load required for generating data can be reduced.

A drawing data generation unit 890 generates drawing data (rasterized wiring data) by performing RIP on the corrected wiring data 504. Further, the drawing data generation unit 890 sends the drawing data to the exposure control unit 980 (FIG. 13). The exposure control unit 980 controls the functional component group 5 based on the drawing data. Thus, the optical head unit 50 directly exposes the substrate W based on the drawing data.

2-2. Wiring Data Generation Method

With the above configuration, a wiring data generation method including the following steps can be performed.

Figure 18:
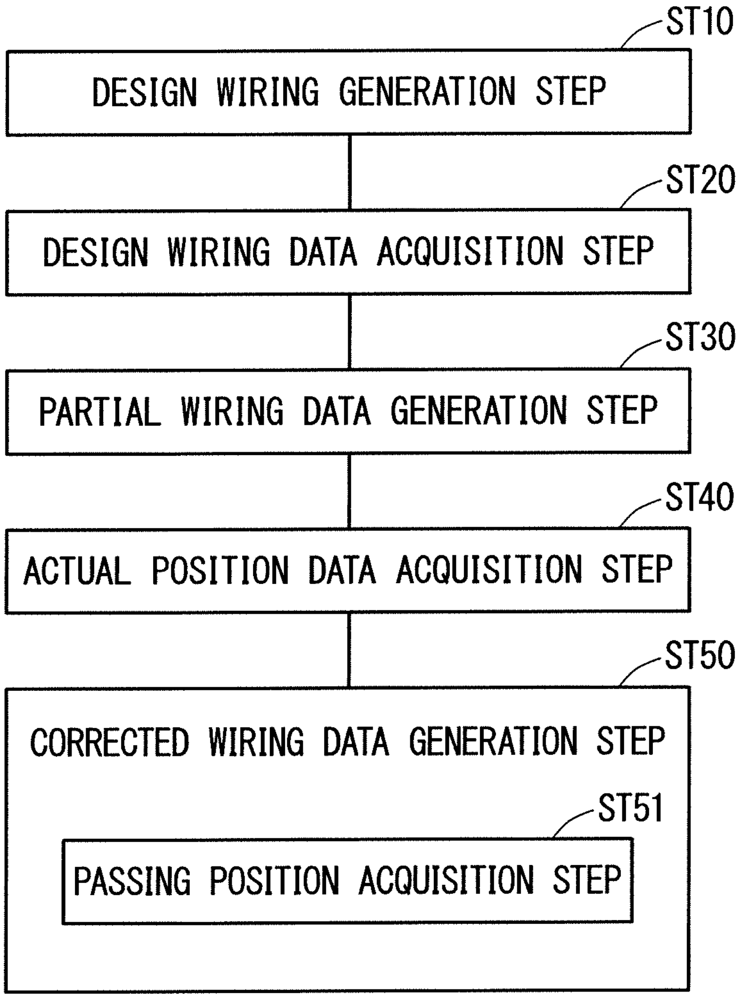
FIG. 18 is a flowchart schematically illustrating a wiring data generation method according to the embodiments.

In a design wiring generation step ST10 (FIG. 18), the design wiring data 501 (FIG. 14) is generated by the design wiring generating unit 810 (FIG. 13). In a design wiring data acquisition step ST20 (FIG. 18), the design wiring data 501 (FIG. 14) generated as described above is acquired by the design wiring data acquisition unit 820 (FIG. 13). As modifications, the design wiring data 501 may be acquired from the basic CAD system 150, and in this case, the design wiring generation step ST10 (FIG. 18) is omitted. In a partial wiring data generation step ST30 (FIG. 18), the partial wiring data 502 (FIG. 15) is generated by the partial wiring data generation unit (FIG. 13). In an actual position data acquisition step ST40 (FIG. 18), the actual position data 503 indicating the actual position 311*pr* (FIG. 16) is acquired by the actual position data acquisition unit 860 (FIG. 13). In a corrected wiring data generation step ST50 (FIG. 18), the corrected wiring data 504 is generated by the corrected wiring data generation unit (FIG. 13).

2-3. Determination as to Whether or not Corrected Wiring Data can be Normally Generated The corrected wiring data generation unit 880 (FIG. 13) may include a determination unit 882 that determines whether the corrected wiring data 504 (FIG. 17) can be normally generated. This determination may be performed based on the actual position 311*pr* calculated from the monitor image obtained by the alignment camera 60. Instead of or in addition to such a determination, a determination of the modifications described below may be performed.

The wiring data generation apparatus 800 includes an error position generation unit 850 for a purpose of enabling the determination of the modifications. The error position generation unit 850 generates an error position having an error from the design position 311*pd* of the electrode 311 based on the predetermined rules. The determination unit 882 determines whether the corrected wiring data 504 (FIG. 17) can be normally generated on an assumption that the actual position 311*pr* is at the error position.

2-4. Designation of Passing Position

In the above description with reference to FIGS. 16 and 17, the case where the data of the linear corrected wiring 411C is generated based on the netlist has been described in detail. However, corrected wiring having a more complicated shape is sometimes required, and in that case, data of the corrected wiring may be generated using the automatic wiring technique. On the other hand, in a case where the corrected wiring is complicated, the calculation load in the automatic wiring may become enormous, and further, it may not be possible to generate appropriate corrected wiring.

The above problem is alleviated by designating a passing position of the corrected wiring before starting the automatic wiring. When it is required to designate the passing position, the corrected wiring data generation unit 880 (FIG. 13) includes a passing position acquisition unit 881 that acquires the passing position. Information on the passing position may be automatically set by the control unit 70, or may be received by the control unit 70 from outside. The corrected wiring data generation unit 880 (FIG. 13) generates the corrected wiring data such that the corrected wiring 411C passes through the passing position acquired by the passing position acquisition unit 881. In other words, the corrected wiring data generation step ST50 (FIG. 18) includes a passing position acquisition step ST51 of acquiring the passing position. The corrected wiring data generation step ST50 generates the corrected wiring data such that the corrected wiring 411C passes through the passing position acquired in the passing position acquisition step ST51. The following specifically describes this technique with reference to the modifications in which the redistribution layer has a more complicated structure than the one described above.

Figure 19:
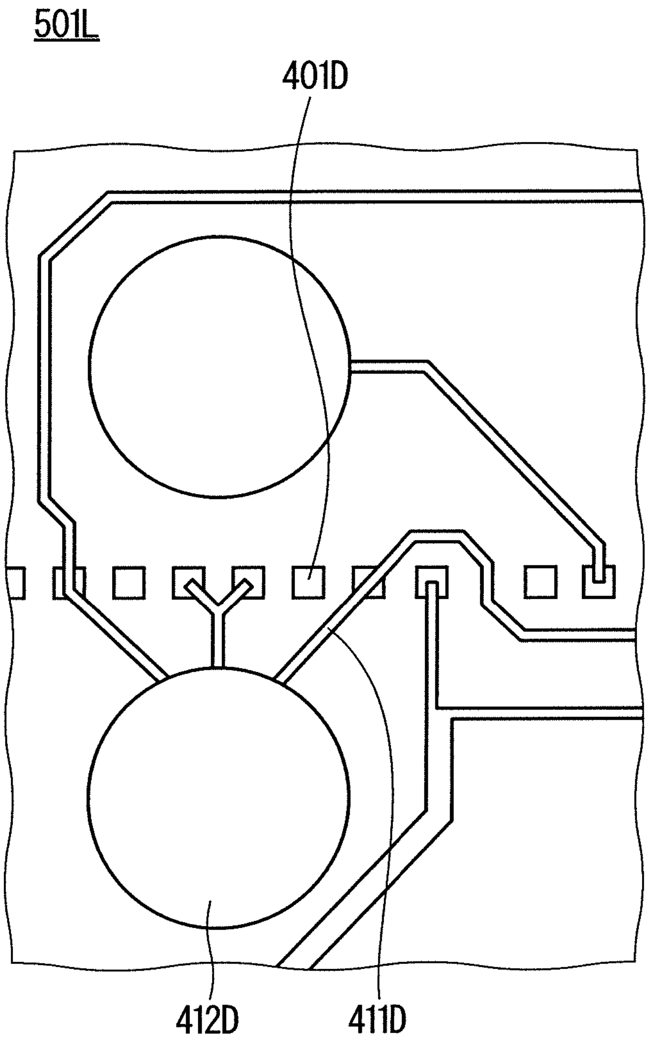
FIG. 19 is a partial plan view showing contents of design data according to modifications.

Referring to FIG. 19, design wiring data SOIL is acquired in a method similar to the case of the design wiring data 501 (FIG. 14).

Figure 20:
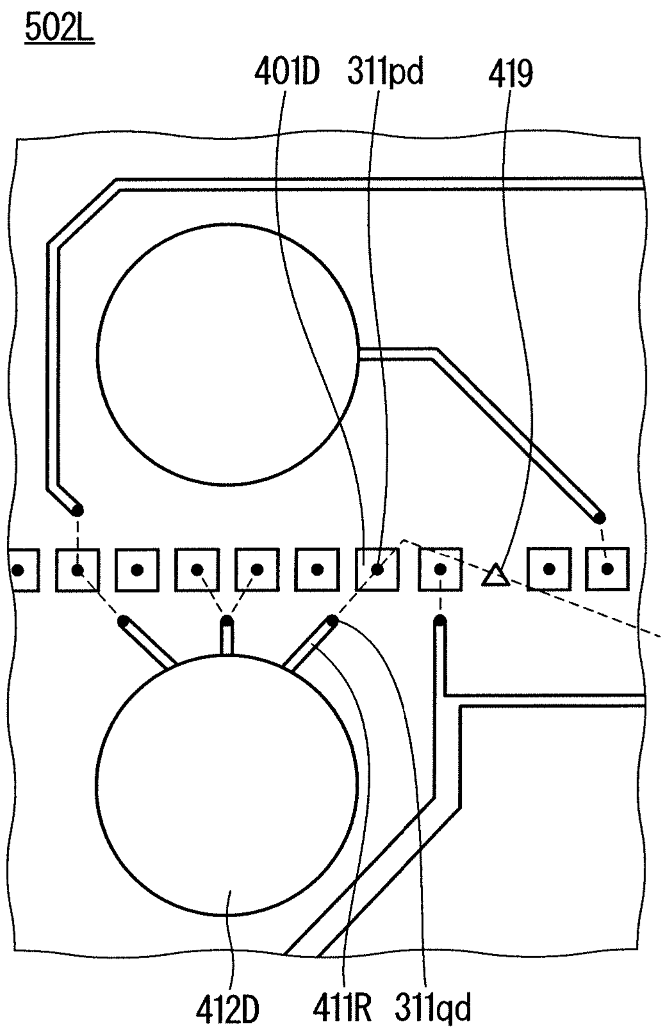
FIG. 20 is a partial plan view showing contents of partial wiring data according to the modifications.

Referring to FIG. 20, next, partial wiring data 502L is generated in a method similar to the case of the partial wiring data 502 (FIG. 15). At this time or after this, the passing position mentioned above is designated by the position of an intermediate pin 419. The position of the intermediate pin 419 may be automatically set by the control unit 70 when the partial wiring data 502L is generated, or may be received by the control unit 70 from outside after the partial wiring data 502L is generated. In the latter case, for example, an operator adjusts the position of the intermediate pin 419 displayed on the display unit 77 (FIG. 3) by operating the input unit 76 (FIG. 3).

Figure 21:
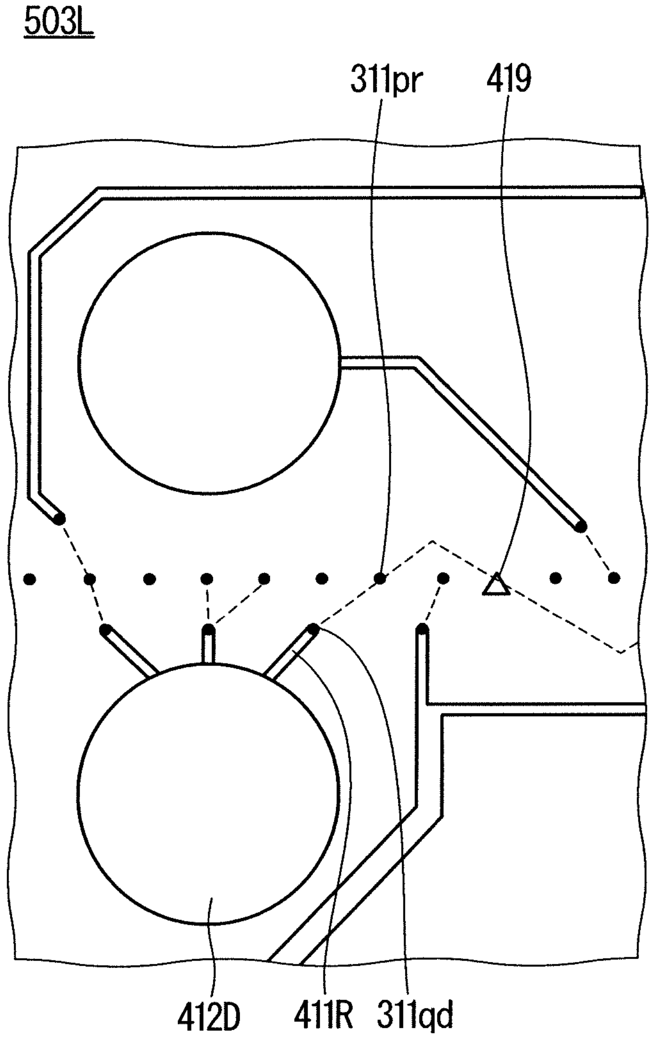
FIG. 21 is a partial plan view showing contents of actual position data according to the modifications.

Referring to FIG. 21, actual position data 503L is acquired in a method similar to the case of the actual position data 503 (FIG. 16).

Figure 22:
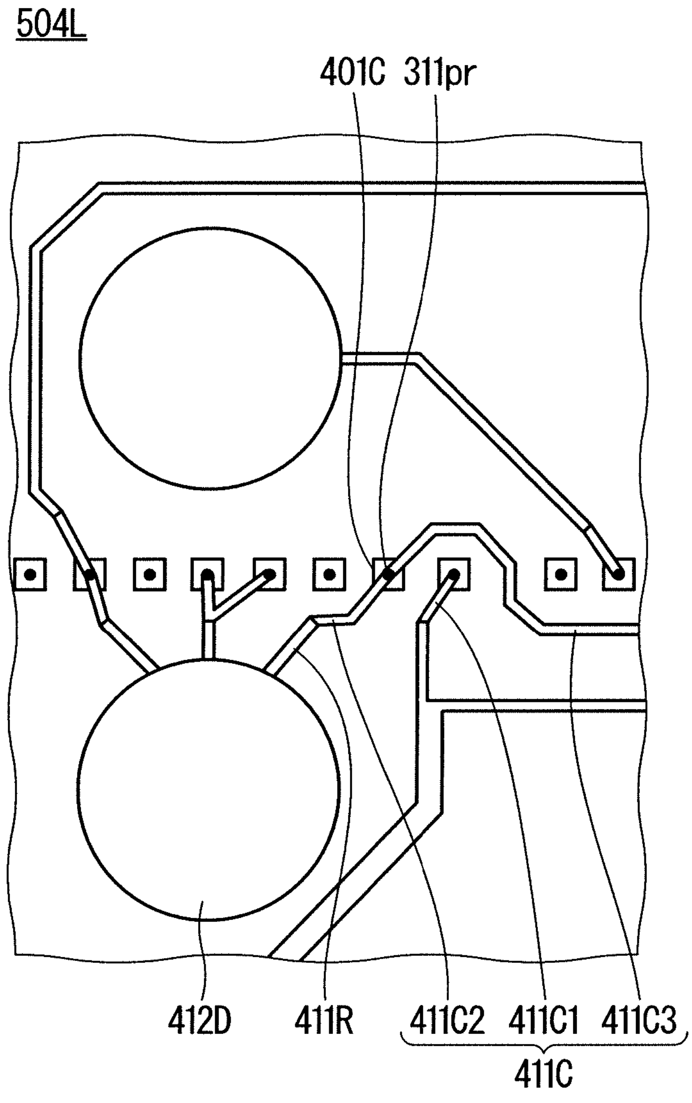
FIG. 22 is a partial plan view showing contents of corrected wiring data according to the modifications.

Referring to FIG. 22, next, corrected wiring data 504L is generated in a method similar to the case of the corrected wiring data 504 (FIG. 17). The corrected wiring 411C in this example includes, for example, corrected wiring 411C1 to 411C3. The corrected wiring 411C1 has a linear pattern shape similar to the corrected wiring 411C (FIG. 17). The corrected wiring 411C2 has a bent pattern shape unlike the corrected wiring 411C (FIG. 17). The corrected wiring 411C3 passes through the position of the intermediate pin 419 (FIG. 21).

2-5. Effects

According to the present embodiments, the partial wiring 411R (FIG. 15) corresponding to the design wiring 411D (FIG. 14) other than the peripheral portion of the design position 311*pd* of the electrode 311 of the semiconductor chip 310 is used as a part of the generated wiring data. Thus, the wiring data can be efficiently generated. Furthermore, since the wiring data generation apparatus 800 generates the corrected wiring data 504 indicating the corrected wiring 411C (FIG. 17) that connects the partial wiring 411R and the electrode 311 at the actual position 311*pr* to each other as the other part of the generated wiring data, it is possible to perform a correction corresponding to the deviation between the design position 311*pd* and the actual position 311*pr* of the semiconductor chip 310 on the substrate W. As described above, the wiring data can be efficiently generated while performing the correction corresponding to the deviation of the semiconductor chip 310 on the substrate W from the design position 311*pd*.

The design wiring data acquisition unit 820 (FIG. 13) of the wiring data generation apparatus 800 may acquire the design wiring data 501 (FIG. 14) generated by the design wiring generating unit 810 of the wiring data generation apparatus 800. In this case, the wiring data generation apparatus 800 (FIG. 13) itself can prepare the design wiring data 501. In other words, the design wiring data acquisition step ST20 (FIG. 18) may acquire the design wiring data (FIG. 14) generated by the design wiring generation step ST10. In this case, the design wiring data 501 can be prepared by the wiring data generation method.

The corrected wiring data generation unit 880 (FIG. 13) of the wiring data generation apparatus 800 may include the determination unit 882 that determines whether or not the corrected wiring data can be normally generated. In this case, a progress of the process using the abnormal corrected wiring data is avoided in the middle of the process. This determination may be performed based on the actual position 311*pr* calculated from the monitor image obtained by the alignment camera 60. Instead of or in addition to the determination based on the actual position 311*pr*, the determination may be performed assuming that the actual position 311*pr* is at the error position generated by the error position generation unit 850. Thus, the determination can be made before the actual position 311*pr* is acquired. Accordingly, the determination can be performed earlier.

The wiring data generation apparatus 800 (FIG. 13) may generate the corrected wiring data 504L (FIG. 22) such that the corrected wiring 411C3 (FIG. 22) passes through the passing position (the position of the intermediate pin 419 (FIG. 21)) acquired by the passing position acquisition unit 881. In other words, in the corrected wiring data generation step ST50 (FIG. 18), the corrected wiring data 504L (FIG. 22) may be generated such that the corrected wiring 411C3 passes through the position of the intermediate pin 419 (FIG. 21). Thus, it is possible to avoid an unnecessary increase in the degree of freedom in designing the corrected wiring 411C3. Accordingly, the automatic generation of the corrected wiring 411C3 can be made efficient.

Although the present invention has been described in detail, the description above is illustrative in all aspects, and the present invention is not limited thereto. It is understood that numerous modifications not illustrated can be assumed without departing from the scope of the present invention. The configurations described in the embodiments and modifications above can be appropriately combined or omitted as long as they do not contradict each other.

EXPLANATION OF REFERENCE SIGNS

1: drawing system
5: functional component group
10: stage
20: stage moving mechanism
50: optical head unit
60: alignment camera (photographing unit)
70: control unit
310: semiconductor chip (electrical element)
311: electrode
311*pd*: design position
311*pr*: actual position
311*qd*: connected position
320: component
321: electrode (connection destination electrode)
401: via
401C: corrected via
401D: design via
402: interlayer insulating film
410: metal layer
411: wiring
411C: corrected wiring
411D: design wiring
411R: partial wiring
412: solder pad
412D: design solder pad
419: intermediate pin
420: covering insulating film
W: substrate

The invention claimed is:

1. A wiring data generation apparatus that generates wiring data indicating wiring for electrically connecting element electrodes of an electrical element arranged on a substrate and connection destination electrodes to be arranged so as to at least partially overlap with said electrical element in a planar layout to each other, the wiring data generation apparatus comprising:

a design wiring data acquisition unit configured to acquire design wiring data indicating design wiring for connecting said element electrodes at design positions on said substrate and said connection destination electrodes to each other;

a partial wiring data generation unit configured to generate partial wiring data indicating partial wiring obtained by deleting peripheral portions of said design positions of said element electrodes in said design wiring;

an actual position data acquisition unit configured to acquire actual position data indicating actual positions of said element electrodes on said substrate; and a corrected wiring data generation unit configured to generate corrected wiring data indicating corrected wiring that connects said partial wiring and said element electrodes at said actual positions to each other.

2. The wiring data generation apparatus according to claim 1, wherein said corrected wiring data generation unit includes a passing position acquisition unit that acquires a passing position, and said corrected wiring data generation unit generates said corrected wiring data such that said corrected wiring passes through said passing position acquired by said passing position acquisition unit.

3. The wiring data generation apparatus according to claim 1, further comprising:

a design wiring generating unit configured to generate said design wiring data based on said design positions of said element electrodes of said electrical element and assumed positions where said connection destination electrodes are to be arranged, wherein said design wiring data acquisition unit acquires said design wiring data generated by said design wiring generating unit.

4. The wiring data generation apparatus according to claim 1, wherein said corrected wiring data generation unit includes a determination unit that determines whether or not said corrected wiring data can be normally generated.

5. The wiring data generation apparatus according to claim 4, further comprising:

an error position generation unit configured to generate error positions having an error from said design positions of said element electrodes based on predetermined rules, wherein said determination unit determines whether or not said corrected wiring data can be normally generated on an assumption that said actual positions are at said error positions.

6. A drawing system comprising:

a wiring data generation apparatus that generates wiring data indicating wiring for electrically connecting element electrodes of an electrical element arranged on a substrate and connection destination electrodes to be arranged so as to at least partially overlap with said electrical element in a planar layout to each other, the wiring data generation apparatus comprising:

a design wiring data acquisition unit configured to acquire design wiring data indicating design wiring for connecting said element electrodes at design positions on said substrate and said connection destination electrodes to each other;

a partial wiring data generation unit configured to generate partial wiring data indicating partial wiring obtained by deleting peripheral portions of said design positions of said element electrodes in said design wiring;

an actual position data acquisition unit configured to acquire actual position data indicating actual positions of said element electrodes on said substrate; and a corrected wiring data generation unit configured to generate corrected wiring data indicating corrected wiring that connects said partial wiring and said element electrodes at said actual positions to each other; and a stage configured to hold said substrate;

a photographing unit configured to photograph said electrical element in order to calculate actual position data indicating said actual positions of said element electrodes of said electrical element on said substrate held by said stage; and an optical head unit configured to directly expose said substrate based on said wiring data generated by said wiring data generation apparatus.

7. A wiring data generation method for generating wiring data indicating wiring for electrically connecting element electrodes of an electrical element arranged on a substrate and connection destination electrodes to be arranged so as to at least partially overlap with said electrical element in a planar layout to each other, the wiring data generation method comprising:

a design wiring data acquisition step of acquiring design wiring data indicating design wiring for connecting said element electrodes at design positions on said substrate and said connection destination electrodes to each other;

a partial wiring data generation step of generating partial wiring data indicating partial wiring obtained by deleting peripheral portions of said design positions of said element electrodes in said design wiring;

an actual position data acquisition step of acquiring actual position data indicating actual positions of said element electrodes on said substrate; and a corrected wiring data generation step of generating corrected wiring data indicating corrected wiring that connects said partial wiring and said element electrodes at said actual positions to each other.

8. The wiring data generation method according to claim 7, wherein said corrected wiring data generation step includes a passing position acquisition step of acquiring a passing position, and said corrected wiring data generation step generates said corrected wiring data such that said corrected wiring passes through said passing position acquired in said passing position acquisition step.

9. The wiring data generation method according to claim 7, further comprising:

a design wiring generation step of generating said design wiring data based on said design positions of said element electrodes of said electrical element and assumed positions where said connection destination electrodes are to be arranged, wherein said design wiring data acquisition step acquires said design wiring data generated by said design wiring generation step.

* * * * *